(12) United States Patent
Yamamoto et al.

(10) Patent No.: US 11,648,932 B2
(45) Date of Patent: May 16, 2023

(54) PERIPHERY MONITORING DEVICE

(71) Applicant: AISIN CORPORATION, Kariya (JP)

(72) Inventors: Kinji Yamamoto, Anjo (JP); Kazuya Watanabe, Anjo (JP); Tetsuya Maruoka, Okazaki (JP); Takayuki Nakasho, Anjo (JP); Itsuko Fukushima, Nagoya (JP)

(73) Assignee: AISIN CORPORATION, Kariya (JP)

( * ) Notice: Subject to any disclaimer, the term of this patent is extended or adjusted under 35 U.S.C. 154(b) by 116 days.

(21) Appl. No.: 16/761,372

(22) PCT Filed: Oct. 29, 2018

(86) PCT No.: PCT/JP2018/040082
§ 371 (c)(1),
(2) Date: May 4, 2020

(87) PCT Pub. No.: WO2019/093176
PCT Pub. Date: May 16, 2019

(65) Prior Publication Data
US 2021/0370912 A1    Dec. 2, 2021

(30) Foreign Application Priority Data
Nov. 7, 2017   (JP) .............................. JP2017-214709

(51) Int. Cl.
*B60W 30/02*       (2012.01)
*B60D 1/00*        (2006.01)

(52) U.S. Cl.
CPC .............. *B60W 30/02* (2013.01); *B60D 1/00* (2013.01); *B60W 2300/14* (2013.01); *B60W 2420/42* (2013.01); *B60W 2530/203* (2020.02)

(58) Field of Classification Search
CPC ........... B60W 30/02; B60W 2530/203; B60W 2300/14; B60W 2420/42; B60D 1/00
(Continued)

(56) References Cited

U.S. PATENT DOCUMENTS

2016/0001704 A1 * 1/2016 Nakasho .................. B60R 1/00
                                                               701/36
2016/0009225 A1   1/2016 Watanabe et al.
(Continued)

FOREIGN PATENT DOCUMENTS

JP          3436436 B2     8/2003
JP       2004-338637 A    12/2004
(Continued)

OTHER PUBLICATIONS

English Translation for JP2008149764A (Year: 2021).*
International Search Report for PCT/JP2018/040082 dated Dec. 25, 2018 [PCT/ISA/210].

*Primary Examiner* — Mahmoud S Ismail
(74) *Attorney, Agent, or Firm* — Sughrue Mion, PLLC

(57) ABSTRACT

A periphery monitoring device includes a coupling determiner that determines whether a towed vehicle is coupled to a towing vehicle to which the towed vehicle can be coupled; a target setter that sets a target moving position to be a target for moving at least the towed vehicle coupled to the towing vehicle; a storing controller that stores, as a moving target image, an image, including the target moving position, of a peripheral image generated by as imager provided at the towing vehicle; and an image controller that displays the stored moving target image in association with the towing vehicle or the towed vehicle included in a current image generated by the imager and currently displayed on a display device.

7 Claims, 11 Drawing Sheets

(58) Field of Classification Search
USPC .............................................................. 701/1
See application file for complete search history.

(56) References Cited

U.S. PATENT DOCUMENTS

2016/0167583 A1* 6/2016 Schrepfer ............... B60R 11/04
                                                          348/148
2017/0158134 A1* 6/2017 Shigemura ................ B60R 1/00
2018/0121742 A1* 5/2018 Son ........................ G01C 21/28

FOREIGN PATENT DOCUMENTS

JP          2008-149764 A       7/2008
JP           2008149764 A   *   7/2008
JP          2010-030341 A       2/2010

* cited by examiner

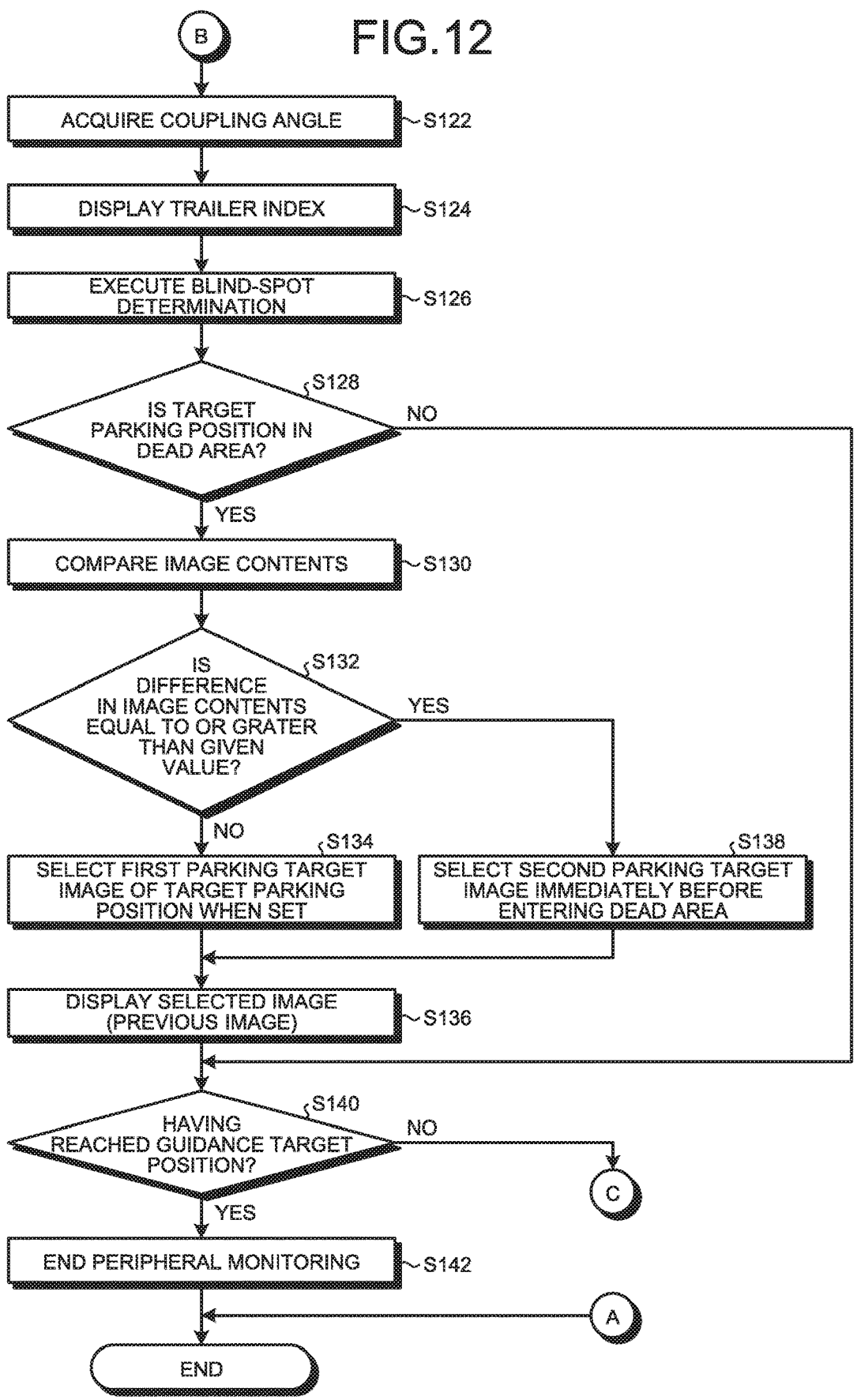

PERIPHERY MONITORING DEVICE

CROSS-REFERENCE TO RELATED APPLICATIONS

This application is a national stage application of International Application No. PCT/JP2018/040082, filed Oct. 29, 2018, which designates the United States, incorporated herein by reference, and which claims the benefit of priority from Japanese Patent Application No. 2017-214709, filed Nov. 7, 2017, the entire contents of which are incorporated herein by reference.

TECHNICAL FIELD

Embodiments of the present invention relate generally to a periphery monitoring device.

BACKGROUND ART

Conventionally, towed vehicles (trailers) are known. A towed vehicle is rotatably coupled to the rear of a towing vehicle (tractor) for towing. The driver of a towing vehicle, while not coupled to the towed vehicle, can check rearward by viewing side-view mirrors or an image, generated by an imager (camera) located at the rear of the towing vehicle, on a display near a driver's seat. However, while the towing vehicle is coupled to the towed vehicle, the towed vehicle may partially or entirely block the viewing area of the side-view mirrors and the imaging area of the imager depending on the coupling angle of the towed vehicle, creating blind spots. In view of this, rearview devices are proposed. A rearview device allows the driver to understand the situation behind the towed vehicle irrespective of the coupling angle of the towed vehicle similarly to viewing rearward on the side-view mirrors, by displaying, on the display of the towing vehicle, images from imagers newly attached to the lateral sides of the towed vehicle.

CITATION LIST

Patent Literature

Patent Document 1: Japanese Patent No. 3436436

SUMMARY OF INVENTION

Problem to be Solved by the Invention

Conventionally, however, it is necessary to attach imagers to every towed vehicle, and provide transmission wires through which images generated by the towed vehicle are transmitted to the towing vehicle as well as a connector device that can connect and disconnect the transmission lines depending on whether or not the towed vehicle is coupled. This results in cost increase. Further, the towing vehicle may be coupled to various towed vehicles having different specifications. This makes it necessary to standardize the specifications of the display system of the towing vehicle and the imaging system and the transmission system of the towed vehicle, which may make it difficult to introduce the systems.

An object of the present invention is to provide a periphery monitoring device which can allow the driver to easily understand the surroundings, in particular, the area behind the towed vehicle without cost increase, irrespective of the specifications of the towed vehicle.

Means for Solving Problem

According to one embodiment of the present invention, a periphery monitoring device includes a coupling determiner that determines whether a towed vehicle is coupled to a towing vehicle to which the towed vehicle can be coupled; a target setter that sets a target moving position to be a target for moving at least the towed vehicle coupled to the towing vehicle; a storing controller that stores, as a moving target image, an image, including the target moving position, of a peripheral image generated by an imager provided at the towing vehicle; and an image controller that displays the stored moving target image in association with the towing vehicle or the towed vehicle included in a current image generated by the imager and currently displayed on a display device. As configured above, the periphery monitoring device can display the stored moving target image on the current image in association with the towing vehicle or the towed vehicle for example. Thus, the periphery monitoring device can indicate the relative relationship between the target moving position and the towing vehicle or the towed vehicle by the stored moving target image irrespective of the contents of the current image. That is, the periphery monitoring device of a simple configuration can allow the driver to understand a peripheral situation.

According to one embodiment, the storing controller of the periphery monitoring device may store at least the moving target image generated when the target moving position is set. As configured above, the periphery monitoring device can store the moving target image when the towed vehicle is sure to move, for example. As a result, the periphery monitoring device can ensure storing of a highly usable image while avoiding decrease in the storage capacity of the storage due to storing of unnecessary images.

According to one embodiment, the storing controller of the periphery monitoring device may start storing the moving target image when the target moving position is set. As configured above, the periphery monitoring device can store two or more moving target images from when the towed vehicle is sure to move, for example. As a result, the periphery monitoring device can store two or more moving target images including the target moving position and select a moving target image representing the relative relationship between the target moving position and the towing vehicle or the towed vehicle appropriately from among the two or more images while avoiding decrease in the storage capacity of the storage. As a result, the periphery monitoring device can allow the driver to more appropriately understand a peripheral situation from the stored moving target image.

According to one embodiment, the periphery monitoring device further includes a blind-spot determiner that determines whether the target moving position enters a dead area caused by the towed vehicle in an imaging area of the imager. The image controller may display the stored moving target image in association with the towing vehicle or the towed vehicle when the target moving position is to enter the dead area. As configured above, if there is a blind spot in the imaging range caused by a turning (coupling angle) of the towed vehicle hiding the target moving position, the periphery monitoring device can complement the dead area by the stored moving target image. As a result, the periphery monitoring device can continuously display the target moving position and maintain visibility thereof.

According to one embodiment, the image controller of the periphery monitoring device may superimpose at least an image of the target moving position included in the stored moving target image, on at least an area of the dead area, when the target moving position is in the dead area on the current image, the area corresponding to the target moving position. As configured above, if there is a dead area on the current image, for example, the periphery monitoring device can superimpose the stored moving target image to cover the dead area, and thereby generate an image with less strangeness representing the dead area as if no dead area is present, and improve the visibility of the displayed image.

According to one embodiment, the image controller of the per monitoring device may superimpose the moving target image on the dead area in a transparent mode. As configured above, in response to a change in the surroundings of the target moving position after storing the moving target image such as when a pedestrian enters, for example, the periphery monitoring device can superimpose the moving target image in a light display mode while displaying the pedestrian in the current image. As a result, the periphery monitoring device enables the driver to easily understand the current situation and the surroundings of the target moving position. Further, it is made easier for the driver to recognize presence of the dead area and the fact that the dead area is complemented by the moving target image, leading to alerting the driver.

According to one embodiment, when a first moving target image and a second moving target image exhibit a difference in content equal to or greater than a given value, the image controller of the periphery monitoring device may display the second moving target image in association with the current image, the first moving target image being stored when the target moving position is set, the second moving target image being stored immediately before the target moving position enters the dead area. As configured above, with the difference being equal to or greater than a given value between the contents of the first parking target image and of the second parking target image, occurrence of change such as motion of a movable object around the target parking position in a period from storing the first parking target image to storing the second parking target image can be inferred. For example, occurrence of a change such as an entry of a pedestrian or another vehicle parking in an area adjacent to the target moving position can be inferred. In this case, the periphery monitoring device can display the second moving target image reflecting the latest situation as the image to be associated with the current image. Meanwhile, with the difference being less than a given value between the contents of the first parking target image and of the second parking target image, no substantial change in the surroundings of the target parking position in a period from storing the first parking target image to storing the second parking target image can be inferred. In this case, the periphery monitoring device uses an image (first moving target image) of the target moving position initially recognized by the driver, such as a high-quality image of the target moving position generated from the front by a lateral imager in a close position, as the image to be associated with the current image. As a result, the periphery monitoring device enables the driver to easily recognize the target moving position on the image on display.

According to one embodiment, the periphery monitoring device further include a position acquirer that acquires a current position of the towing vehicle with reference to a position of the towing vehicle at the time of setting the target moving position; an angle acquirer that acquires a coupling angle between the towing vehicle and the towed vehicle; and an index acquirer that acquires a trailer index corresponding to a size of the towed vehicle, the trailer index being superimposable on the current image. In displaying the stored moving target image in association with the current image, the image controller may determine a display posture of the trailer index in accordance with the current position of the towing vehicle and the coupling angle, and displays the trailer index on the current image in a superimposed manner. As configured above, the periphery monitoring device enables the driver to check the posture of the towed vehicle such as the turning direction or angle on the current image, and to accurately recognize the positional relationship between the towed vehicle and an object (obstacle or pedestrian), if found around the towed vehicle.

BRIEF DESCRIPTION OF DRAWINGS

FIG. 12 is a flowchart of a second half of exemplary display processing of a periphery monitoring device according to an embodiment.

DESCRIPTION OF EMBODIMENTS

Hereinafter, exemplary embodiments of the present invention will be disclosed. Elements of embodiments described below, and actions and results (effects) attained by the elements are merely exemplary. The present invention can be implemented by elements other than those disclosed in the following embodiments, and can attain at least one of various effects and derivative effects based on the basic elements.

Figure 1:
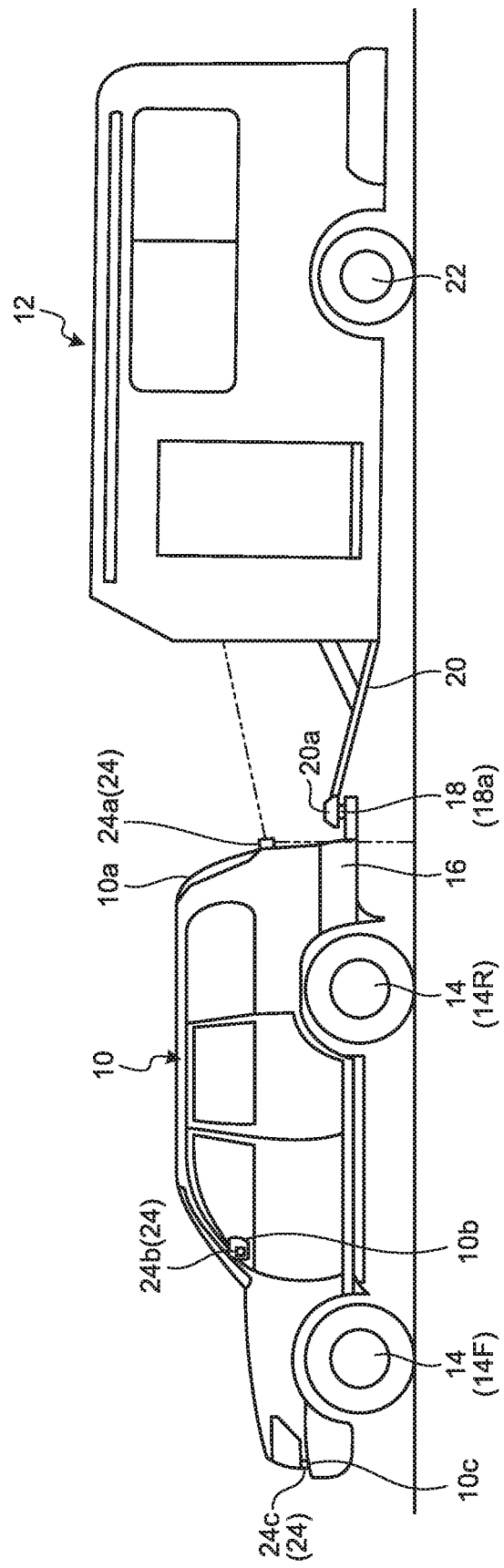
FIG. 1 is a side view schematically illustrating an exemplary coupling state between a towing vehicle equipped with a periphery monitoring device according to an embodiment and a towed vehicle.
Figure 2:
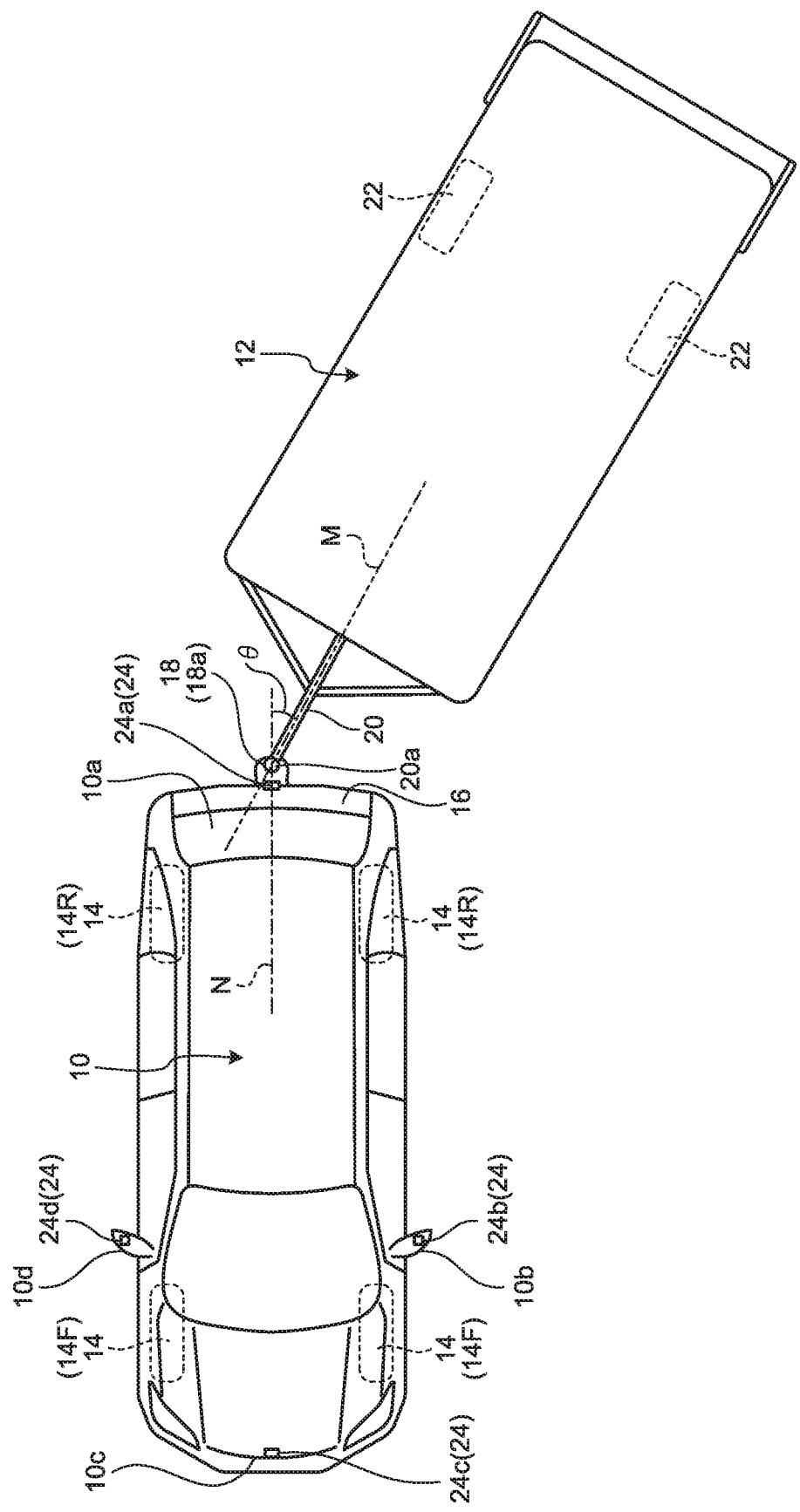
FIG. 2 is a top view schematically illustrating an exemplary coupling state between a towing vehicle equipped with a periphery monitoring device according to an embodiment and a towed vehicle.
Figure 3:
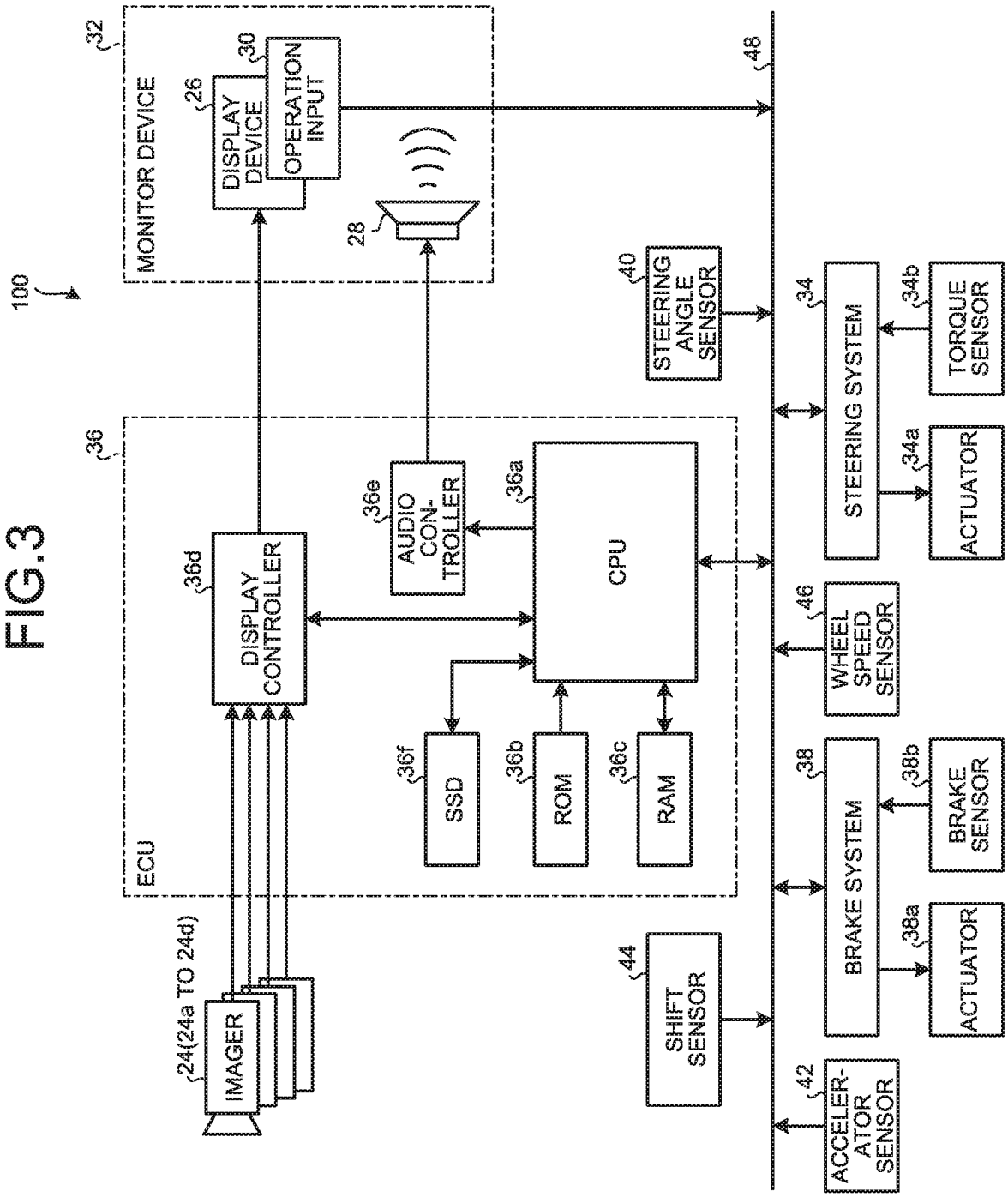
FIG. 3 is an exemplary configuration block diagram of a periphery monitoring system including a periphery monitoring device according to an embodiment.

FIG. 1 is a schematic side views of a towing vehicle 10 including a periphery monitoring device according to an embodiment and a towed vehicle 12 towed by the towing vehicle 10. In FIG. 1, leftward is defined as frontward of the towing vehicle 10, and rightward is defined as rearward of the towing vehicle 10. FIG. 2 is a top view of the towing vehicle 10 and the towed vehicle 12 illustrated in FIG. 1. FIG. 3 is an exemplary block configuration diagram of a periphery monitoring system 100 including the periphery monitoring device mounted on the towing vehicle 10.

The towing vehicle 10 according to the embodiment may be an automobile (internal combustion automobile) including an internal combustion (engine not illustrated) as a power source, an automobile (electric automobile or fuel-cell automobile) including an electric motor (not illustrated) as a power source, or an automobile (hybrid automobile) including both of the internal combustion and the electric motor as a power source. The towing vehicle 10 may be a sport utility vehicle (SUV), a pickup truck including a rear deck, or a general passenger vehicle. The towing vehicle 10 can incorporate various transmissions and various devices or units (systems, parts and components, and etc.) for driving the internal combustion or the electric motor. The method, number, and layout of the devices related to the driving of the wheels 14 (front wheels 14F and rear wheels 14R) in the towing vehicle 10 can be variously set.

The towing vehicle 10 includes a towing device (hitch) 18 on a rear bumper 16. The towing device 18 projects from, for example, a bottom center of the rear bumper 16 in a vehicle lateral direction and fixed to the frame of the towing vehicle 10. The towing device 18 includes, for example, a hitch ball vertically (top to bottom of the vehicle) standing and having a spherical distal end. The hitch ball is covered with a coupler located at the distal end of a coupling member 20 fixed to the towed vehicle 12. As structured above, the towing vehicle 10 and the towed vehicle 12 are coupled to each other while the towed vehicle 12 can swing (turn) with respect to the towing vehicle 10 in the vehicle lateral direction. That is, the hitch ball of the towing device 18 serves to transfer forward, backward, leftward, and rightward movements to the towed vehicle 12 (coupling member 20), and receive acceleration or deceleration power.

The towed vehicle 12 is, for example, a box-type vehicle including at least one of a riding space, a living area, and an accommodation space, or may be of a deck type on which luggage (e.g., a container or a boat) is to be loaded. FIG. 1 illustrates the towed vehicle 12 as a driven vehicle including a pair of trailer wheels 22 as driven wheels and no drive wheels and no steering wheel.

As illustrated in FIGS. 1 and 2, the towing vehicle 10 includes a plurality of imagers 24, for example, four imagers 24a to 24d. The imagers 24 are, for example, digital cameras including a built-in image sensor such as a charge coupled device (CCD) image sensor or a complementary metal oxide semiconductor (CMOS) image sensor. The imagers 24 output moving data (image data) at a given frame rate. Each of the imagers 24 includes a wide-angle lens or a fisheye lens, and can image a horizontal range of, for example, 140 to 220 degrees. The optical axis of each imager 24 may be set obliquely downward. Thus, the imagers 24 sequentially generate images of the surrounding environment outside the towing vehicle 10 including an object (obstacle such as a pedestrian or a vehicle) and a road surface on which the towing vehicle 10 is movable, and outputs the images as image data.

The imager 24a (rear imager) is located, for example, on the rear wall of the towing vehicle 10 below a rear hatch 10a. The imager 24a can image an area (for example, the range indicated by a two-dot chain line in FIG. 1) including the rear end (rear bumper 16) of the towing vehicle 10, the towing device 18, the coupling member 20, and at least the front end of the towed vehicle 12, and an area behind the towed vehicle 12 laterally viewed from the towed vehicle 12. The image data generated by the imager 24a can be used in recognizing the towed vehicle 12 and detecting the coupling state (for example, coupling angle or coupling or non-coupling) between the towing vehicle 10 and the towed vehicle 12. In this case, the periphery monitoring system 100 can acquire the coupling state and the coupling angle between the towing vehicle 10 and the towed vehicle 12 from the image data generated by the imager 24a, therefore, it can be simplified in configuration and reduce computational load or image processing load.

The imager 24b (left-side imager) is located, for example, at the left end. of the towing vehicle 10, such as on a left side mirror 10b, to generate a leftward image including an area around the left side of the towing vehicle 10 (for example, an area from left front to left rear). The imager 24c (front imager) is located, for example, at the front, that is, the front end of the towing vehicle 10 in a vehicle front-rear direction, for example, on a front grill 10c or a front bumper, to generate a frontward image including an area ahead of the towing vehicle 10. The imager 24d (right-side imager) is located, for example, at the right end of the towing vehicle 10, for example, on a right side mirror 10d, to generate a rightward image including an area around the right side of the towing vehicle 10 (for example, an area from right front to right rear). The periphery monitoring system 100 can execute computation and image processing to the image data generated by the imagers 24 to generate an image with a wider viewing angle or a virtual overhead image (planar view) of the towing vehicle 10 viewed from above.

As illustrated in FIG. 3, the interior of the towing vehicle 10 is equipped with a display device 26 and an audio output device 28. The display device 26 is, for example, a liquid crystal display (LCD) or an organic electroluminescent display (OELD). The audio output device 28 is, for example, a speaker. The display device 26 is covered with, for example, a transparent operational input 30 such as a touch panel. The occupant (for example, driver) can view images on the screen of the display device 26 through the operation input 30. The occupant can also touch, press, and move the operation input with his or her finger or fingers at positions corresponding to the images displayed on the screen of the display device for executing operational inputs. The display device 26, the audio output device 28, and the operational input 30 are included, for example, in a monitor device 32 located at a lateral or horizontal center of a dashboard of the towing vehicle 10. The monitor device 32 can include an operational input (not illustrated) such as a switch, a dial, a joystick, and a push button. The monitor device 32 can double as, for example, a navigation system or an audio system.

As illustrated in FIGS. 1 and 2, the towing vehicle 10 is, for example, a four-wheeled vehicle with two right and left front wheels 14F and two right and left rear wheels 14R. The four wheels 14 are steerable. As illustrated in FIG. 3, the towing vehicle 10 includes a steering system 34 that steers at least two of the wheels 14. The steering system 34 includes an actuator 34a and a torque sensor 34b. The steering system 34 is electrically controlled by an electronic control unit (ECU) 36 to operate the actuator 34a. The steering system 34 represents, for example, an electric power steering system, or a steer by wire (SBW) system. The steering system 34 allows the actuator 34a to add torque, i.e., assist torque to the steering wheel to supplement the steering force, or turn the wheels 14. In this case, the actuator 34a may turn one or two or more of the wheels 14. The torque sensor 34b detects, for example, a torque applied to the steering wheel by the driver.

As illustrated in FIG. 3, in the periphery monitoring system 100 (periphery monitoring device), a brake system 38, a steering angle sensor 40, an accelerator sensor 42, a shift sensor 44, and a wheel speed sensor 46 are electrically connected. to one another via an in-vehicle network 48 as an electric communication line in addition to the ECU 36, the monitor device 32, and the steering system 34. The in-vehicle network 48 is configured as, for example, a controller area network (CAN). The ECU 36 can control the steering system 34 and the brake system 38 by transmitting a control signal thereto through the in-vehicle network 48. The ECU 36 can receive results of detection from the torque sensor 34b, a brake sensor 38b, the steering angle sensor 40, the accelerator sensor 42, the shift sensor 44, and the wheel speed sensor 46, and an operation signal from the operational input 30 through the in-vehicle network 48.

The ECU 36 includes, for example, a central processing unit (CPU) 36a, a read only memory (ROM) 36b, a random access memory (RAM) 36c, a display controller 36d, an audio controller 36e, and a solid state drive (SSD) 36f (flash memory). The CPU 36a reads a stored (installed) program from a nonvolatile storage such as the ROM 36b, and executes computation according to the program. The CPU 36a executes, for example, image processing to an image displayed on the display device 26. For example, the CPU 36a executes computation and image processing to the image data generated by the imagers 24 to generate a peripheral image (for example, overhead image).

The RAM 36c temporarily stores various kinds of data for use in calculation by the CPU 36a. The display controller 36d mainly synthesizes image data displayed on the display device 26 among the computation of the ECU 36. The audio controller 36e mainly processes audio data output from the audio output device 28 among the computation of the ECU 36. The SSD 36f is a rewritable nonvolatile storage, and can store data after power-off of the ECU 36. The CPU 36a, the ROM 36b, and the RAM 36c can. be integrated in the same package. The ECU 36 may include another logical operation processor such as a digital signal processor (DSP) or a logical circuit, instead of the CPU 36a, or may include a hard disk drive (HDD) instead of the SSD 36f. The SSD 36f or the HDD may be separated from the ECU 36.

The brake system 38 represents, for example, an anti-lock brake system (ABS) that prevents locking of the brake, an anti-skid system (electronic stability control (ESC) that prevents the towing vehicle 10 from skidding during cornering, an electric brake system that increases braking force (executes a brake assist), or brake by wire (BBW). The brake system 38 applies braking force to the wheels 14 and to the towing vehicle 10 via an actuator 38a. The brake system 38 can execute various controls by detecting locking of the brake, idling of the wheels 14, and indication of skidding from a difference in rotation between the right and left wheels 14. The brake sensor 38b serves to sense the position of a movable part of a brake pedal, for example.

The steering angle sensor 40 serves to, for example, detect the steering amount of the steering wheel. The ECU 36 acquires the driver's steering amount of the steering wheel and the steering amount of each wheel 14 during automatic steering from the steering angle sensor 40 for various controls. The accelerator sensor 42 serves to, for example, detect the position of a movable part of an accelerator pedal. The shift sensor 44 serves to, for example, detect the position of a movable part of a shift operator. The wheel speed sensor 46 is a sensor that detects the rotating speed per unit time or the rotation amount of the wheels 14. The wheel speed sensor 46 outputs a wheel-speed pulse number representing the detected rotating speed as a sensor value. The ECU 36 acquires a sensor value from the wheel speed sensor 46 to calculate a moving amount of the towing vehicle 10 from the sensor value for various controls.

The configurations, arrangement, and electrical connection of the various sensors and actuators described above are merely exemplary, and can be variously set (changed).

In moving the towed vehicle 12 coupled to the towing vehicle 10 to a set target moving position, for example, the display device 26 can display a pre-stored moving target image including the target moving position, at timing different from timing at which the moving target image is stored. For example, while the towing vehicle 10 moves toward a set target moving position, the towed vehicle 12, which is rotatable with respect to the towing vehicle 10, may move in a direction different from a moving direction of the towing vehicle 10 to block the target moving position displayed in the current image on the display device 26 (has entered a dead area). In such a case, the display device 26 displays the target moving position in the dead area using the stored moving target image. That is, the display device 26 complements the image. This makes it possible for the driver to properly, easily check the set target moving position while moving the towing vehicle 10 coupled to the towed vehicle 12, contributing to reducing driving load.

Figure 5:
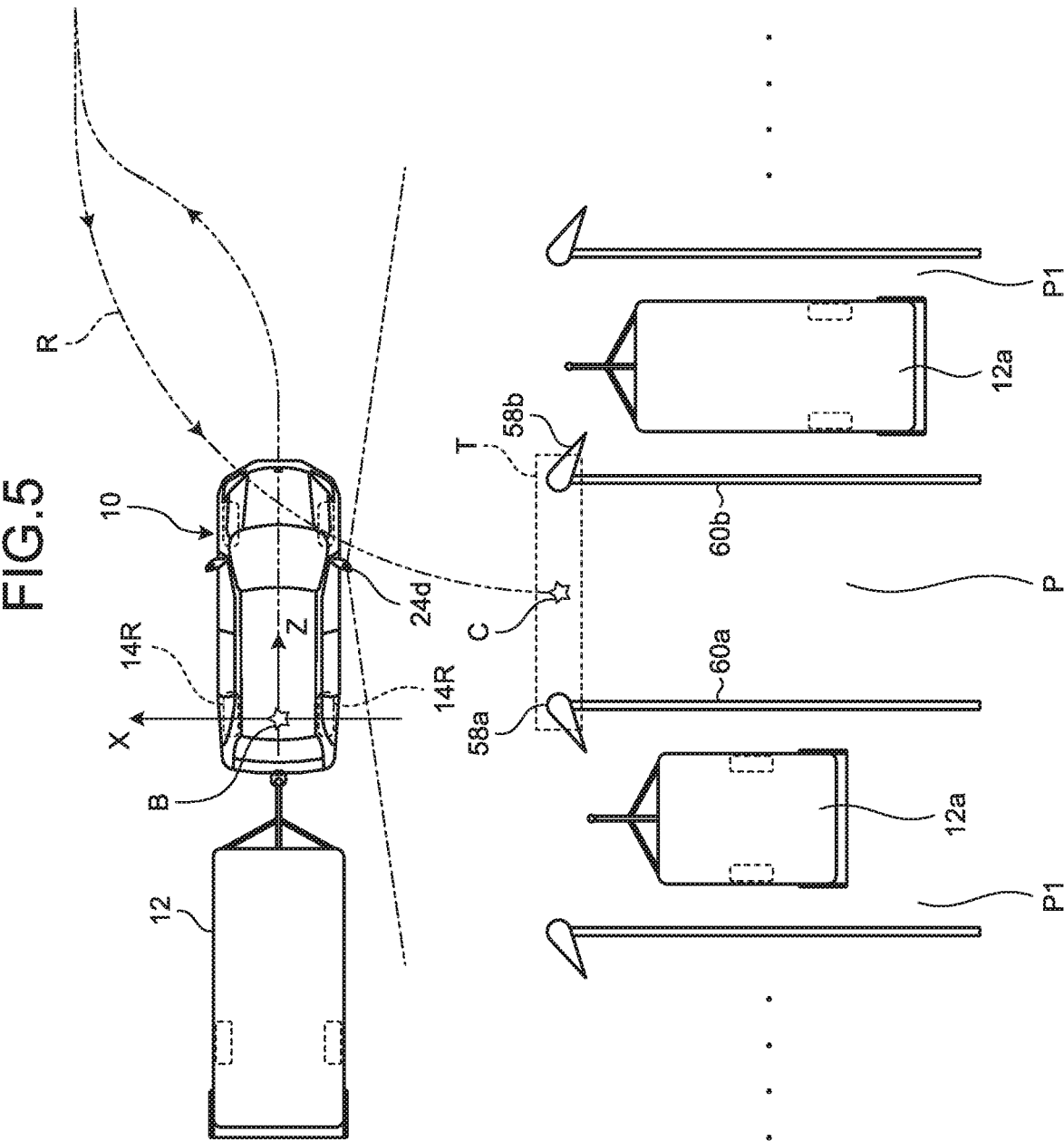
FIG. 5 is a schematic diagram illustrating an example of setting a target parking position (target moving position) and a guidance route by a periphery monitoring system including a periphery monitoring device according to an embodiment.

The following will describe parking the towed vehicle 12 in a given parking space as an example of peripheral monitoring during moving the towing vehicle 10 coupled to the towed vehicle 12. Thus, in the following, the target moving position refers to a target parking position, and the moving target image refers to a parking target image. To move the towed vehicle 12, the driver may first recognize the entrance of the parking space and set the entrance as the target parking position. Thus, the present embodiment will describe, as an exemplary target parking position T, an area defined by a pair of three-dimensional objects such as pylons 58a and 58b that define the width of the entrance of a parking space P, as illustrated in FIG. 5. In this case, unless the driver sees at least one of the pylon 58a and the pylon 58b having entered the dead area, the driver cannot recognize the target parking position T since the width of the target parking position T is indefinite. Thus, in the present embodiment, the parking target image refers to an image representing both the pylons 58a and 58b defining the target parking position T, and containing an entrance area of the parking space P defined by the pylons 58a and 58b.

The target parking position I is not limited to an area having a width as described above, and may be set to, for example, a pinpoint position such as the pylon 58a or the pylon 58b defining the width of the parking space P, a sectional line 60a or a sectional line 60h, or a width center of the entrance of the parking space P. The present embodiment describes, as a parking form, an example that the towing vehicle 10 moves the towed vehicle 12 to the parking space P in a given posture (for example, substantially parallel to the sectional lines 60a and 60b) and detaches the towed vehicle 12 to park only the towed vehicle 12 in the parking space P.

Figure 4:
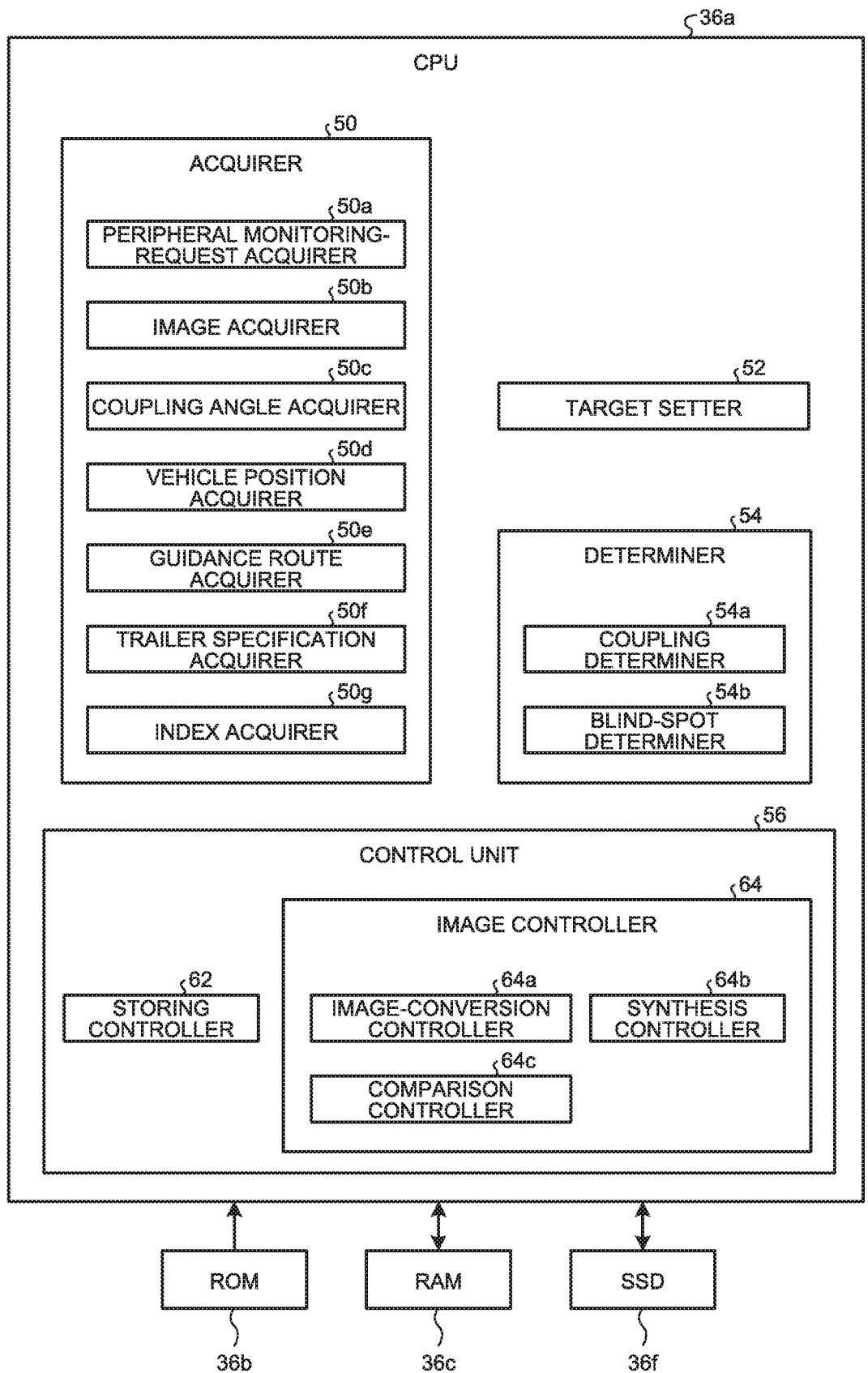
FIG. 4 is a configuration block diagram of an exemplary CPU of a periphery monitoring device according to an embodiment.

The CPU 36a in the ECU 36 includes various modules for executing display processing to implement peripheral monitoring using the pre-stored parking target image (previous image) as described above. The various modules are implemented by the CPU 36a's reading and executing an installed and stored program from the storage such as the ROM 36b. As illustrated in FIG. 4, for example, the CPU 36a includes modules such as an acquirer 50, a target setter 52, a determiner 54, and a control unit 56.

In order to acquire various kinds of information to implement peripheral monitoring, the acquirer 50 includes a peripheral monitoring-request acquirer 50a, an image acquirer 50b, a coupling angle acquirer 50c, a vehicle position acquirer 50d, a guidance route acquirer 50e, a trailer-specification acquirer 50f, and an index acquirer 50g.

In response to a driver's peripheral monitoring request for parking through the operational input 30 during driving the towing vehicle 10 coupled to the towed vehicle 12, for example, the peripheral monitoring-request acquirer 50a receives a request signal. In another embodiment, in response to detection of the towing vehicle 10 coupled to the towed vehicle 12 having entered a parking lot with a global positioning system (GPS), the peripheral monitoring-request acquirer 50a may consider the detection as a request for periphery monitoring for parking, and accept a request signal.

After the peripheral monitoring-request acquirer 50a has acquired the request signal, the image acquirer 50b acquires image information required for displaying the surroundings of at least the towing vehicle 10. For example, the image acquirer 50b acquires a plurality of items of image data (for example, frontward image data, leftward image data, rightward image data, rearward image data) from the imagers 24a to 24d that generate the images of the perimeter of the towing vehicle 10. The acquired images may be sequentially displayed on the display device 26 as actual images without change or may be subjected to viewpoint conversion to be sequentially displayed thereon in overhead mode. The images may be temporarily stored as previous images in the storage such as the RAM 36c or the SSD 36f, and displayed together with the image (current image) on the display device 26 at later timing.

The coupling angle acquirer 50c acquires a coupling angle θ between the towing vehicle 10 and the towed vehicle 12, that is, an angle of the coupling member 20 relative to the towing device 18 as a fulcrum. The coupling angle acquirer 50c can acquire the coupling angle θ in various manners. For example, the coupling angle acquirer 50c can detect the coupling angle θ of the coupling member 20 with respect to the towing device 18 (towing vehicle 10) from an image based on image data generated by the imager 24a. The coupling angle acquirer 50c detects, for example, a straight line passing the coupler 20a of the coupling member 20, of a straight line extending in a front-rear direction of the towed vehicle 12, and sets this straight line as a coupling axis M of the coupling member 20, as illustrated in FIG. 2. Since a vehicle axis N of the towing vehicle 10 is known on the image generated by the imager 24a, the coupling angle θ can be detected from the vehicle axis N and the coupling axis M.

The present embodiment illustrates an example that the imager 24a is located immediately above the towing device 18, that is, coaxially with the vehicle axis N. Thus, the coupling member 20 can be looked down from substantially directly above, which can facilitate detection of the coupling angle θ between the vehicle axis N and the coupling axis M. Meanwhile, the imager 24a may not be placed directly above the towing device 18 due to structural factors of the towing vehicle 10 or other reasons. For example, the imager 24a may be placed in a location horizontally separate from the center of the rear hatch 10a. In this case, the two-dimensional coordinates of the image generated by the imager 24a can be converted to three-dimensional coordinates with reference to the ground height (known value based on specifications) of the towing device 18 (hitch ball 18a), to detect the coupling angle θ on the basis of the vehicle axis N and the coupling axis M.

In another embodiment, the coupling angle acquirer 50c may detect the coupling angle θ by analyzing an image representing a position of a marker attached to the coupling member 20 or the front wall surface of the towed vehicle 12. In still another embodiment, the towing device 18 may include an angle sensor to detect the angle of the coupling member 20, and the coupling angle acquirer 50c may acquire the detected angle as the coupling angle θ. The coupling angle θ acquired by the coupling angle acquirer 50c is used to determine whether the target parking position enters the dead area caused by the towed vehicle 12, or to calculate a guidance route R for guiding the towed vehicle 12 to the parking space P as illustrated in FIG. 5. Further, the coupling angle is used to determine a display angle (display posture) of a trailer index (trailer icon) on display for the purpose of improving viewability of the towed vehicle 12 on the display device 26.

The vehicle position acquirer 50d acquires a current positron (vehicle position) of the towing vehicle 10 during stopping or traveling. The vehicle position acquirer 50d sets, for example, a coordinate system of the set target parking position T with the origin at the position of the towing vehicle 10. The vehicle position acquirer 50d can estimate the position of the towing vehicle 10 in the above coordinate system from the turning radius of the towing vehicle 10 based on a steering angle from the steering angle sensor 40, a moving amount of the towing vehicle 10 based on a speed from the wheel speed sensor 46, and a traveling direction of the towing vehicle 10 from the shift sensor 44. In another embodiment, the vehicle position acquirer 50d can estimate the vehicle position through image recognition of an image based on the image data acquired by the image acquirer 50b. In this case, for example, the vehicle position acquirer 50d can create an optical flow from the image data sequentially output from the imagers 24, and calculate the current position of the towing vehicle 10 from the optical flow. Further, the vehicle position acquirer 50d may identify the current position with a GPS.

In the following, the vehicle position acquirer 50d determines various positions from the above coordinate system having the origin at the position of the towing vehicle 10 at the time of setting the target parking position T, as an example. The vehicle position acquirer 50d. determines, for example, the target parking position T and the position of the stored parking target image for associating the parking target image with the current image, using the coordinates of this coordinate system. In addition, the vehicle position acquired by the vehicle position acquirer 50d is usable in recognition of a relative position between the towing vehicle 10 and the target parking position T or determination on whether the target parking position T enters the dead area caused by the towed vehicle 12. The vehicle position can also be used to calculate the guidance route R for guiding the towed vehicle 12 to the parking space P.

As illustrated in FIG. 5, for example, the guidance route acquirer 50e acquires the guidance route R, serving to guiding the towing vehicle 10 from the current position to the target parking position T in the parking space P on, for example, a coordinate system (X-Z, coordinates) defined when the target parking position T is set. The guidance route acquirer 50e sets, for example, a guidance reference point B substantially at the center of the axle connecting the right and left rear wheels 14R of the towing vehicle 10, and calculates the guidance route R such that the guidance reference point B substantially matches a target guidance point C set prior to the start of guidance. In the present embodiment, the center of the target parking position T defined by the pylons 58a and 58b located at the entrance of the parking space P is defined as the target guidance point C. By moving the guidance reference point B of the towing vehicle 10 to the target guidance point C, the towed vehicle 12 coupled to the rear of the towing vehicle 10 can be placed in the parking space P. The guidance route R can be found (calculated) by a known method, therefore, a detailed description thereof is omitted. The guidance route R of the towing vehicle 10 is calculated such that the towed vehicle 12 can be moved to the parking space P in a given posture with the minimum number of turns in a shortest distance from the guidance reference point B representing the current position of the towing vehicle 10 to the target guidance point C. Herein, the given posture refers to, for example, the state of the towed vehicle 12 in the parking space P with lateral and longitudinal gaps relative to the parking space P being in a given range, and an angle between the longitudinal center line of the parking space P and the towed vehicle 12 being a given value or less. The current position (guidance reference point B) of the towing vehicle 10 and the target guidance point C may be transmitted to an external system (for example, a parking-lot management system) to calculate guidance route R. The guidance route acquirer 50e may acquire the guidance route R from the external system, for example.

Figure 6:
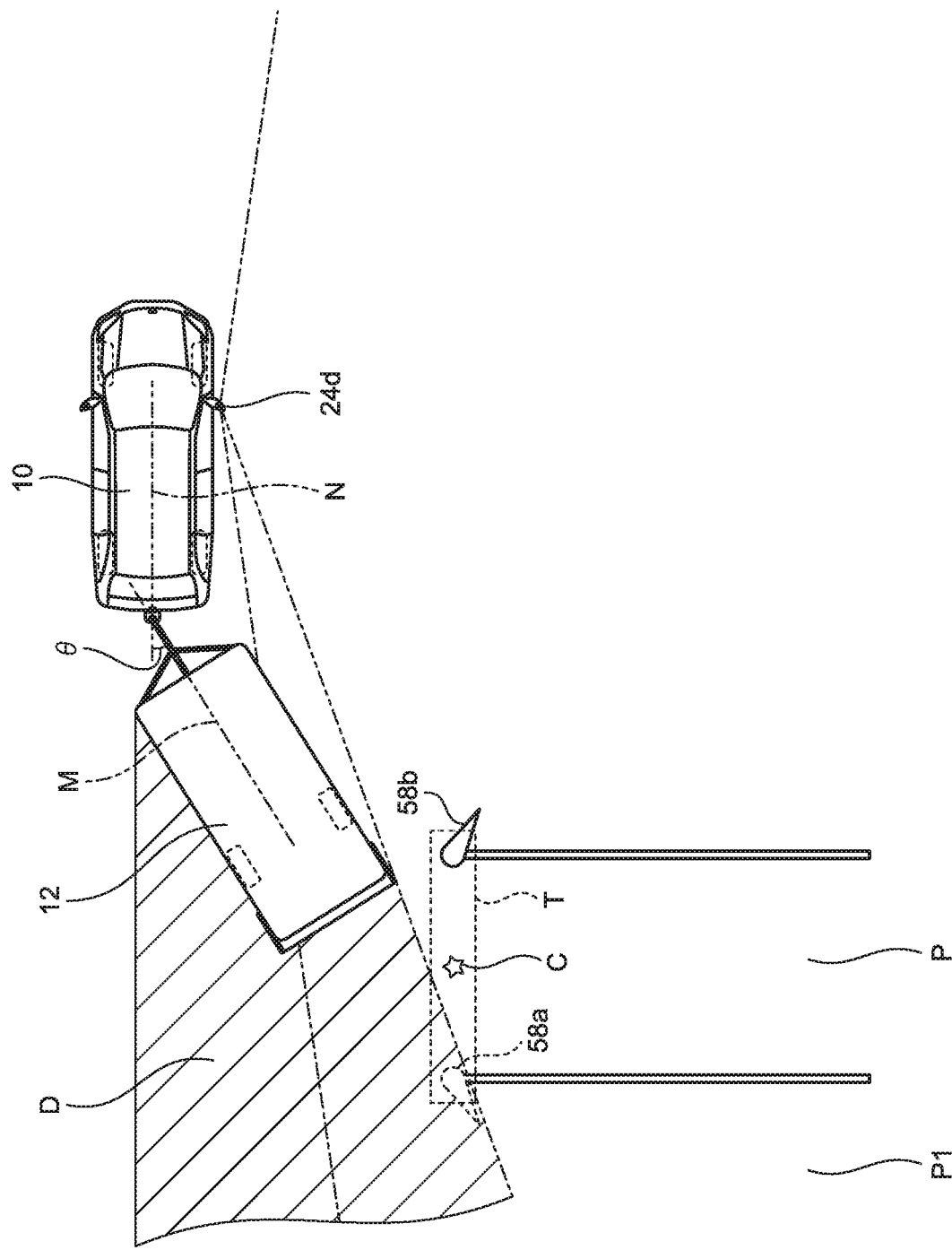
FIG. 6 is a schematic diagram illustrating an example that the target parking position is in a dead area due to the coupling between a towing vehicle and a towed vehicle.

The trailer-specification acquirer 50f acquires specifications of the towed vehicle 12 (for example, sizes of the towed vehicle 12). As illustrated in FIG. 5, the imager 24d located on the right lateral surface of the towing vehicle 10 can generate an image of the target parking position (area including the pylons 58a and 58b) in the parking space P when the towing vehicle 10 coupled to the towed vehicle 12 passes ahead of the parking space P. As illustrated in FIG. 6, while the towing vehicle 10 coupled to the towed vehicle 12 is moving along the guidance route R (refer to FIG. 5), the coupling angle θ of the towed vehicle 12 may change, resulting in hiding the target parking position T partially or entirely on the display device 26. In FIG. 6, the pylon 58a included in the target parking position is located in a dead area D caused by the towed vehicle 12, and thus cannot be seen on the display device 26. In this case, the driver may not be able to check one end of the target parking position T, and be difficult to know the condition of the parking space P (size of the parking space P or positional relationship with respect to a towed vehicle 12a (refer to FIG. 5)) parked in an adjacent parking space P1. To determine whether the target parking position I (pylon 58a) is in the dead area D, the actual size of the towed vehicle 12 is needed. Thus, the trailer-specification acquirer 50f acquires information such as the longitudinal length and the width of the towed vehicle 12 input through the operational input 30.

In order to calculate the guidance route R for allowing the towed vehicle 12 to move to the parking space P defined by the target parking position T, the guidance route acquirer 50e is to understand the behavior of the towed vehicle 12 rotatably coupled to the towing vehicle 10 via the towing device 18. During backward travel of the towing vehicle 10, the towed vehicle 12 rotatable with respect to the towing vehicle 10 may behave the same as or differently from the towing vehicle 10. For example, while the towing vehicle 10 and the towed vehicle 12 are coupled in a balanced state, the towing vehicle 10 and the towed vehicle 12 behave in the same manner. That is, the towing vehicle 10 and the towed vehicle 12 can be regarded as a united object to know their moving state. For example, with the vehicle axis N of the towing vehicle 10 and the coupling axis M of the towed vehicle 12 substantially matching (substantially becoming one line), the towing vehicle 10 and the towed vehicle 12 are placed in a balanced state. With the vehicle axis N and the coupling axis M not matching but the turning centers of the towing vehicle 10 and of the towed vehicle 12 substantially matching, the towing vehicle 10 and the towed vehicle 12 is placed in a balanced state. The turning center of the towing vehicle 10 can be found from a current steering angle of the towing vehicle 10 and the length of the wheelbase of the towing vehicle 10. The turning center of the towed vehicle 12 can be found from the coupling angle θ between the towing vehicle 10 and the towed vehicle 12 and the length of the wheelbase of the towed vehicle 12. The length of the wheelbase of the towed vehicle 12 is from the towing device 18 to the axle of the trailer wheel 22 of the towed vehicle 12 including the coupling member 20. However, the towing vehicle 10 can be coupled to the towed vehicles 12 having various specifications (lengths), and the length of the wheelbase differs depending on the specifications of the towed vehicle 12. Thus, the trailer-specification acquirer 50f allow the driver to directly input the wheelbase length of the towed vehicle 12 for determining the balanced state through the operational input 30 together with information such as the longitudinal length and the width of the towed vehicle 12. The driver can input such specifications, referring to the specification sheet of the towed vehicle 12, for example.

The index acquirer 50g reads, from a list stored in the storage such as the ROM 36b, a trailer index (trailer icon) of a size and shape corresponding to the longitudinal length and the width of the towed vehicle 12 acquired by the trailer-specification acquirer 50f. To form an overhead image through image processing including viewpoint conversion or synthesis to the images generated by the imagers 24, various kinds of correction may not be sufficient to resolve distortion and extended shape of the images. For example, the towed vehicle 12 may be extended or deformed as further away from the viewpoint, which makes it difficult to know the positional relationship between the towed vehicle 12 and peripheral objects (for example, the pylons 58a and 58b). In such a case, superimposing the trailer icon corresponding to the actual shape on the current image makes it easier for the driver to know the positional relationship between the towed vehicle 12 and peripheral objects. For display of the overhead image, the index acquirer 50g also acquires a vehicle icon representing the vehicle (towing vehicle 10) which is not displayable based on the image data generated by the imagers 24. The vehicle icon and the trailer icon can be changed in coupling posture on display in accordance with the coupling angle θ acquired by the coupling angle acquirer 50c.

In response to receipt of the request signal for peripheral monitoring by the peripheral monitoring-request acquirer 50a, the target setter 52 enables setting of the target parking position T. For example, after display of an image based on the image data acquired by the image acquirer 50b on the display device 26 in response to the peripheral monitoring request, the driver can designate a position on the display device 26 with the operational input 30. The driver designates a position in an intended parking location displayed on the display device 26 using the operational input 30. After the CPU 36a determines the position as suitable for parking the towed vehicle 12, the target setter 52 sets the position as the target parking position T. Parking suitability of a driver's designated location relative to the towed vehicle 12 can be determined by a known method. For example, through image analysis of the images generated by the imagers 24, parking suitability can be determined from the interval between the pylon 58a and the pylon 58b being greater than the width of the towed vehicle 12 by a given value or more, the depth of the parking space P being greater than the longitudinal length of the towed vehicle 12 by a given value or more. The towing vehicle 10 may include a ranging device such as sonar, and the target setter 52 may determine whether or not to be able to set the target parking position T in a designated space from a result of the ranging. In addition, the target setter 52 may present, on the display device 26, one or two or more candidates for the parking space P where the target parking position T can be set, and allow the driver to select a desired parking position from among the candidates.

The determiner 54 includes a coupling determiner 54a that determines the coupling state between the towing vehicle 10 and the towed vehicle 12 and a blind-spot determiner 54b that determines whether the target parking position T is in the blind spot of the towed vehicle 12.

For example, the coupling determiner 54a can determine the coupling state on the basis of input information which has been input to the operational input 30 by the driver of the towing vehicle 10 when coupling the vehicle to the towed vehicle 12. After recognition of the towed vehicle 12 from the image, subjected to image processing, based on the image data representing the area behind the towing vehicle 10 acquired by the image acquirer 50b, the coupling determiner 54a can determine the coupling state on the basis of the recognition information. The towing device 18 may include a sensor that senses the coupling between the towing device 18 and the coupling member 20, and the coupling determiner 54a may determine the coupling state on the basis of detected information. The towed vehicle 12 coupled to the towing vehicle 10 is subjected to lighting control of stop lamps, direction indicators, and width indicators located on the rear end of the towed vehicle 12 under the control of the towing vehicle 10. In this case, control wires connect between the towing vehicle 10 and the towed vehicle 12. The coupling determiner 54a may determine the coupling state in accordance with a signal representing the connection of the control lines.

The blind-spot determiner 54b determines whether the target parking position T is hidden by the towed vehicle 12 on the image displayed on the display device 26. As illustrated in FIG. 6, for example, the imaging range is defined by the angle of view and the posture of the imager 24d on the right side of the towing vehicle 10 (one dot chain line). Meanwhile, the dead area D (hatched area) changes depending on the coupling angle θ or the rowed vehicle 12 relative to the towing vehicle 10 (angle between the vehicle axis N and the coupling axis M) (two-dot chain line). Thus, the range of the dead area D is determined from, for example, the coupling angle θ of the towed vehicle 12 and the length and width of the towed vehicle 12, if found on the overhead image (on the coordinate system having the origin at the position of the towing vehicle 10 when the target parking position T is set). Further, the blind-spot determiner 54b can determine whether the pylon 58a or the pylon 58b defining the end of the target parking position I enters the dead area D from the relative position between the current position and the target parking position T of the towing vehicle 10, if found on the coordinate system. That is, the blind-spot determiner 54b can determine in real time whether the target parking position T enters the dead area D. In another embodiment, the blind-spot determiner 54b can calculate similarity between two or more images by a known image difference method or a correlation calculation method (such as template matching using normalized cross-correlation (NCC)) to determine whether the target parking position T is in the dead area D. For example, a benchmark image including the target parking position T (for example, an image of the target parking position T when set) and a current reference image to contain a most current target parking position T are subjected to viewpoint conversion for comparison. Thereby, the blind-spot determiner 54b can determine whether the pylon 58a, for example, appearing in the benchmark image, disappears in the reference image through comparison between the two images. In this case, the blind-spot determiner 54b can determine in real time whether the target parking position T enters the dead area D.

Figure 7:
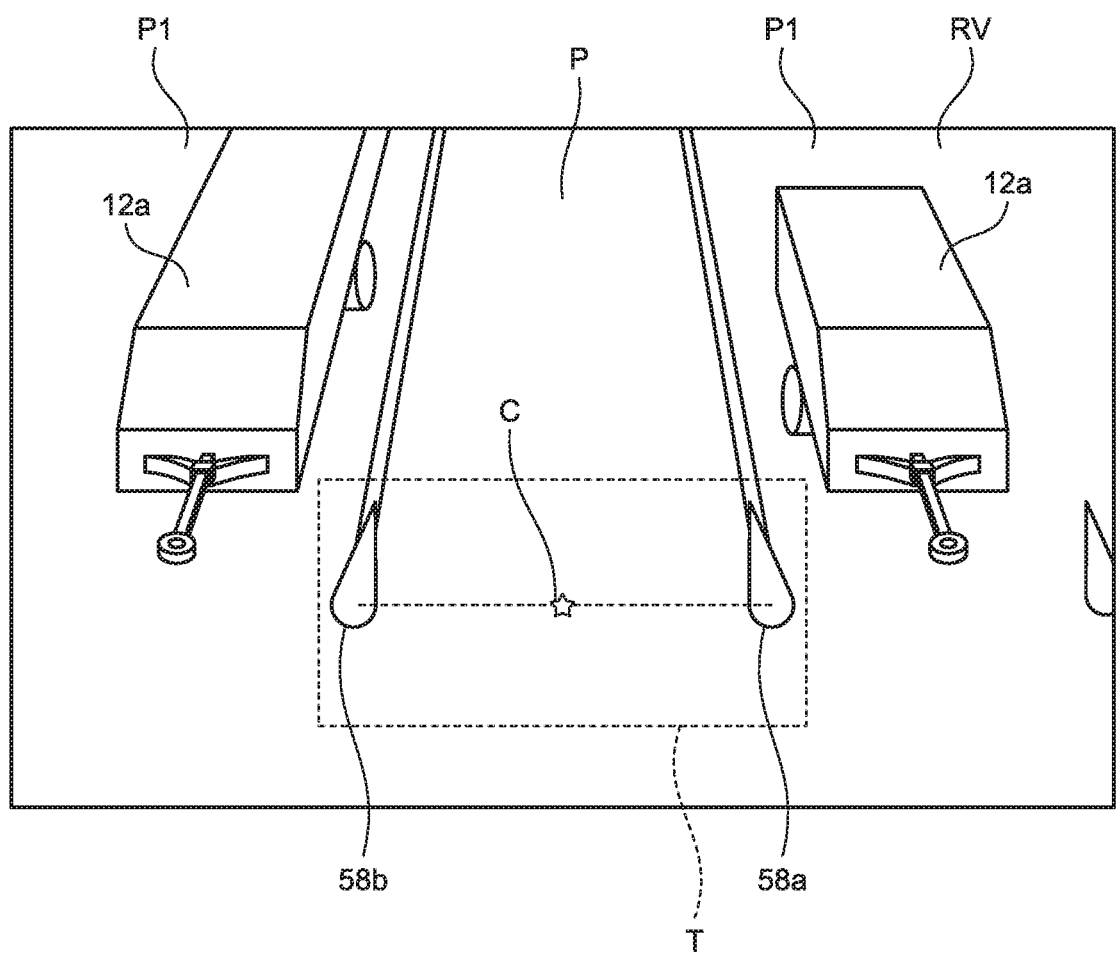
FIG. 7 is a schematic diagram illustrating an exemplary parking target image (moving target image) stored at the time of setting a target parking position in a periphery monitoring device according to an embodiment, and illustrating an exemplary trimming area of the parking target image displayed on a current image.

The control unit 56 includes a storing controller 62 and an image controller 64. The storing controller 62 controls timing at which the image data generated by the imagers 24 and acquired by the image acquirer 50b is stored. In the case of storing all the image data generated by the imagers 24, for example, the RAM 36c or the SSD 36f requires enormous storage capacity, causing cost increase and increase in processing load of the stored image data. In the present embodiment described above, the parking target image including the target parking position T is displayed in association with the towing vehicle 10 or the towed vehicle 12 on the current image and is used in complementing the dead area D, by way of example. Thus, after determination that the vehicle is actually to park, e.g., when the target parking position T is set, the storing controller 62 stores the image based on the image data acquired by the image acquirer 50b as the parking target image, together with the coordinates of the target parking position T in the coordinate system having the origin at the position of the towing vehicle 10 when the target parking position T is set. The driver can set the target parking position T after finding (recognizing) an area suitable for parking, for example. In this case, the target parking position T is likely to be imaged at an angle or in a close distance recognizable from the imagers 24. FIG. 7 illustrates an exemplary parking target image (actual image RV) stored when the target parking position T is set. As illustrated in FIG. 7, for example, the imager 24d is likely to be able to capture the target parking position T, the pylons 58a and 58b, and the parking space P in the vicinity, and generate a high-quality image with high resolution even after subjected to image processing for display.

To move the towed vehicle 12 to the parking space P, the towing vehicle 10 typically passes by the parking space P once and then travels backward to the parking space P. Thus, starting storing the parking target image, for example, when moving the towing vehicle 10 backward may result in storing a blurred image. For example, the target parking position T may be already located in the dead area D due to the towed vehicle 12 or may be in a long distance. Such an image may be blurred as compared with an image generated when the parking space P (target parking position T) is initially identified. Thus, it is preferable to store the image generated at the time of initially identifying the target parking position T as the parking target image in terms of acquiring a higher-quality image.

After the target parking position T is set and the parking target image is stored, a pedestrian may enter the parking space P or the parking state of the towed vehicle 12a. in the adjacent parking space P1 may change, for example. In order to understand such a change in the surroundings of the parking space P (target parking position T), the storing controller 62 may start storing, as the parking target image, the image based on the image data acquired by the image acquirer 50b together with the coordinates of the target parking position T, concurrently with setting of the target parking position T. In this case, the storing controller 62 may sequentially store the parking target image while the towing vehicle 10 is moving, and may not store the parking target image while the towing vehicle 10 is stopping since the target parking positon T does not change in position with respect to the towing vehicle 10 or the towed vehicle 12. This results in contributing to reducing the storage capacity for storing the parking target image.

Since the blind-spot determiner 54b can determine timing at which the target parking position T for example, the pylon 58a or the pylon 58b) enters the dead area D, the storing controller 62 can store the parking target image of the target parking position T when set and the parking target image thereof immediately before entering the dead area D in a distinctive manner. For example, the storing controller 62 can store, as a first parking target image (moving target image), the image of the target parking position T (target moving position) when set, together with the coordinates of the target parking position T. The storing controller 62 can also store, as a second parking target image, the image of the target parking position T immediately before entering the dead area ID, together with the coordinates of the target parking position T. Usage of the second parking target image will be described below in detail.

The image controller 64 includes an image-conversion controller 64a, a synthesis controller 64b, and a comparison controller 64c for various kinds of image processing to the image based on the image data acquired by the image acquirer 50b and the parking target image stored by the storing controller 62.

Figure 8:
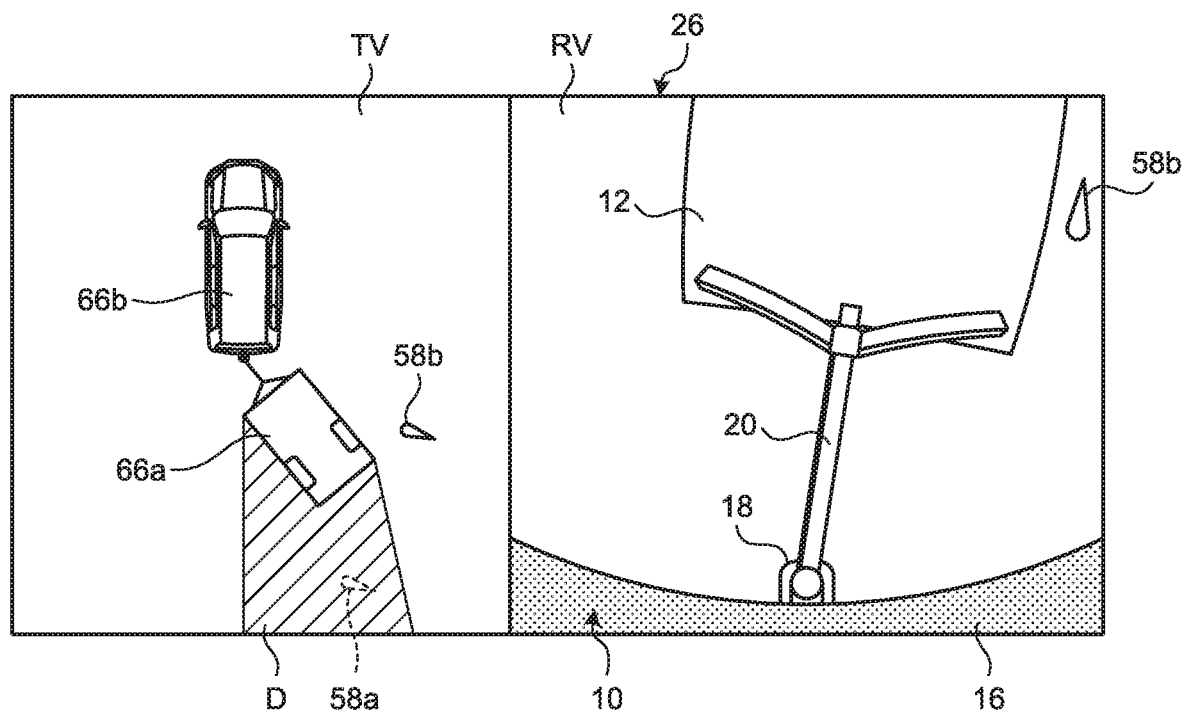
FIG. 8 is a schematic diagram illustrating an exemplary display on a display device by a periphery monitoring device according to an embodiment, and illustrating an example that the target parking position is in a dead area due to the coupling between a towing vehicle and a towed vehicle.

The image-conversion controller 64a performs viewpoint conversion to the image data acquired by the image acquirer 50b to generate a virtual overhead image TV (planar image) of the towing vehicle 10 or the towed vehicle 12 viewed from above, as illustrated in FIG. 8. The overhead image TV depicts a trailer icon 66a corresponding to the towed vehicle 12, a vehicle icon 66b corresponding to the towing vehicle 10, and the pylon 58b. FIG. 8 illustrates the dead area D due to the towed vehicle 12 by hatching and the pylon 58a hidden by the dead area ID by a broken line for the sake of convenience, however, the pylon 58a is not actually displayed at this point. FIG. 8 illustrates an example of displaying the image based on the image data currently generated by the imager 24 on the display device 26, showing in juxtaposition the overhead image TV and the actual image RV generated by the imager 24a, being a rearward image of the area behind the towing vehicle 10. In FIG. 8, the actual image RV depicts the rear bumper 16 and the towing device 18 of the towing vehicle 10 in the bottom, and the coupling member 20 and the front end wall of the towed vehicle 12 in a display area above the rear bumper 16. In addition, the actual image RV shows the pylon 58b located outside the dead area D caused by the towed vehicle 12.

The image-conversion controller 64a performs image conversion to the parking target image stored by the storing controller 62 for the purpose of facilitating image synthesis for display in association with the current image including the dead area D. As illustrated in FIG. 7, for example, the image-conversion controller 64a can trim the part including the target parking position T from the parking target image (actual image RV) stored by the storing controller 62, perform viewpoint conversion to the target parking position T to generate an image corresponding to the overhead image TV currently displayed on the display device 26, or rotate or enlarge or shrink the target parking position T.

The synthesis controller 64b displays the trailer index (trailer icon 66a) and the vehicle icon 66b acquired by the index acquirer 50g on the overhead image TV in a superimposed manner, as illustrated in FIG. 8. The synthesis controller 64b changes the coupling angle between the trailer icon 66a and the vehicle icon 66b on the overhead image TV in real time so as to correspond to the current coupling angle θ between the towing vehicle 10 and the towed vehicle 12 acquired by the coupling angle acquirer 50c. As described above, in generating the overhead image TV from the image data generated by the imagers 24, for example, the image of the towed vehicle 12 may be extended long rearward. In such a case, display of the trailer icon 66a can help the driver understand the posture and shape of the towed vehicle 12, the coupling state with respect to the towing vehicle 10, and the relationship between the surroundings and the towed vehicle 12 on the overhead image TV.

Figure 9:
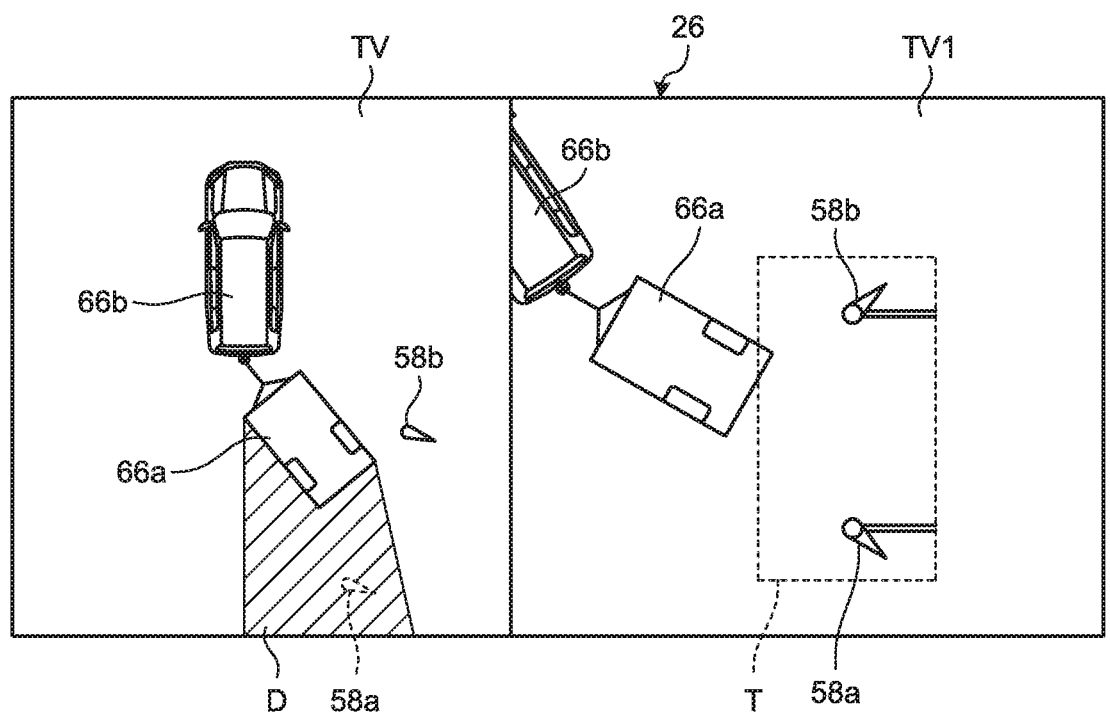
FIG. 9 is a schematic diagram illustrating an example of displaying a stored parking target image in a display area different from a current overhead image in association with a towing vehicle and a towed vehicle in a periphery monitoring device according to an embodiment.
Figure 10:
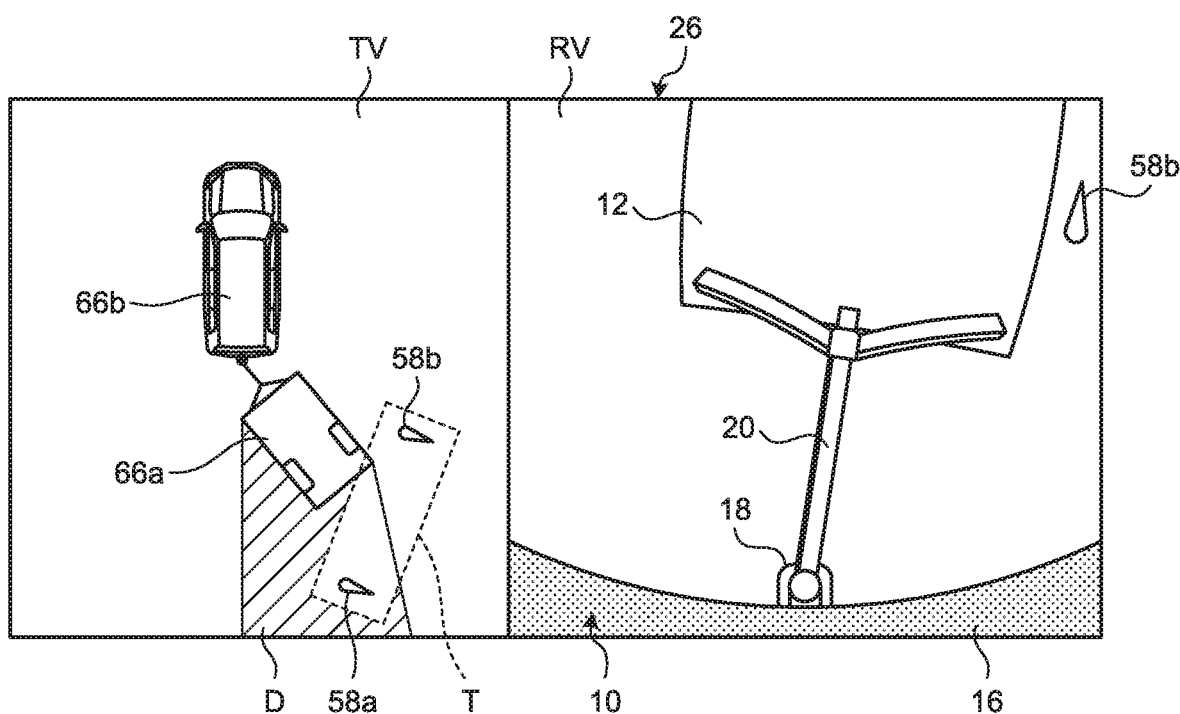
FIG. 10 is a schematic diagram illustrating an example of displaying, in juxtaposition, an overhead image on which a stored paring target image is superimposed corresponding to a dead area in a current overhead image and an actual current image of a towed vehicle in the periphery monitoring device according to an embodiment.

As illustrated in FIG. 8, for example, after the blind-spot determiner 54b determines that the pylon 58a defining the target parking position T is in the dead area D caused by the towed vehicle 12 (the target parking position T is hidden), the synthesis controller 64b can complement the dead area D to generate a synthetic image which presents the target parking position T in a viewable manner, as illustrated in FIGS. 9 and 10.

For example, FIG. 9 illustrates an example of displaying an enlarged view of near the dead area D hiding part of the target parking position T on the overhead image TV on the display device 26, instead of the actual image RV in FIG. 8. In the coordinate system having the origin at the position of the towing vehicle 10 at the time of setting the target parking position T, the coordinates of the current position of the towing vehicle 10 and the coordinates of the target parking position T can be found. The storing controller 62 stores the coordinates of the target parking position T together with the parking target image (properly depicting the target parking position I) of the target parking position T when set. Thus, after the blind-spot determiner 54b determines that the target parking position T is in the dead area D, the synthesis controller 64b superimposes a parking target image of the target parking position T when set stored by the storing controller 62, having been subjected to as viewpoint conversion, trimming, rotation, and scaling by the image-conversion controller 64a, on part of the enlarged current image displayed on the display device 26, the part corresponding to the target parking position T. In this case, the stored parking target image is superimposed on the part of the current image corresponding to the target parking position T to match the coordinates, whereby a synthetic image with less strangeness can be generated.

In the display example of FIG. 9, different windows display the current overhead image TV of the target parking position T (pylon 58a) hidden by the towed vehicle 12, and a complementary overhead image TV1 in juxtaposition. In the complementary overhead image TV1 the target parking position T (pylon 58a) in the dead area D is viewable owing to the stored parking target image. In this case, the driver can recognize the dead area D hiding the target parking position T and the complemented part (displaying the stored parking target image) on the display device 26 at the same time. In addition, the positional relationship between the target parking position T and the towed vehicle 12 is made easily understandable. This makes it possible for the driver to more easily move the towed vehicle 12 (drive the towing vehicle 10) with a sense of safety.

FIG. 10 illustrates another example of displaying the parking target image stored by the storing controller 62 to complement the part hidden by the dead area D on the overhead image TV on the display device 26 in FIG. 8. In FIG. 10, the actual image RV representing that the target parking position T (pylon 58a) is in the dead area D is displayed as it is. After the blind-spot determiner 54b determines that the target parking position T is in the dead area D, the synthesis controller 64b superimposes the parking target image stored by the storing controller 62, on the part of the current overhead image TV corresponding to the target parking position T on the display device 26. In this case, the synthesis controller 64b performs viewpoint conversion, trimming, rotation, and scaling to the parking target image of the target parking position T when set. The synthesis controller 64b superimposes the current image and the parking target image to match the coordinates. The synthesis controller 64b superimposes the parking target image not on the entire current image but uses the trimmed parking target image to complement the minimal part hidden by the guidance route R. This makes it possible to resolve inconvenience that the entire current image returns to the image representing the target parking position T when set. In addition, the synthesis controller 64b may change the transmittance of the parking target image to superimpose. For example, the synthesis controller 64b displays a synthetic image representing no dead area D by superimposing the parking target image at low transmittance. Conversely, at increased transmittance of the parking target image to superimpose, the stored parking target image can be displayed in a light display mode while the current image is maintained. As a result, the synthetic image can reflect change in situation around the most current target parking position T, if such a change occurs after storing of the parking target image, such as when a pedestrian enters or the parking status of the adjacent parking space P1 changes. Display of the parking target image in a transparent mode allows the driver to easily recognize presence of the guidance route R and the fact that the guidance route R is complemented by the parking target image, contributing to alerting the driver. The driver may change the setting of transmittance with the operational input 30 when appropriate or the transmittance may be set to a fixed value.

In the display example of FIG. 10, the overhead image TV and the actual image RV are continuously displayed from start of the peripheral monitoring. After the blind-spot determiner 54b determines that the target parking position T is in the dead area D, the part hidden by the dead area D and its periphery are complemented by the stored parking target image. This enables continuous display of peripheral information of the target parking position T without a sudden change in the image on display. Due to no significant change in image contents, the driver can continue to view the image without a sense of strangeness. In the display example of FIG. 10, the actual image RV is continuously displayed unlike display of only the converted screens with the icons in FIG. 9. Thus, display of the actual image RV can provide a sense of safety to the driver. The driver may select the display mode in FIG. 9 or the display mode in FIG. 10, or the control unit 56 may decide the display mode depending on current situation.

As described above, the synthesis controller 64b complements the current image by the parking target image, for example, triggered by the target parking position T entering the dead area D. This enables smooth image display after the complementation and can immediately abate influence of the dead area D, if occurs. This results in reducing strangeness of the current image on display, enabling the driver to easily move the towed vehicle 12 (drive the towing vehicle 10) with a sense of safety.

The comparison controller 64c compares two or more parking target images stored by the storing controller 62, and selects a parking target image to be associated with the current image, to thereby reflect change in the situation around the target parking position T in the current image, as in the change in the transmittance. As described above, the storing controller 62 starts storing the parking target image when the target parking position I is set. That is, the storing controller 62 stores the change in the situation around the target parking position I in chronological order. In view of this, the comparison controller 64c compares the contents of the first parking target image stored when the target parking position T is set with the contents of the second parking target image stored immediately before the blind-spot determiner 54b determines that the target parking position T is in the dead area D. Such a comparison can be implemented by a general image recognition method such as normalized cross-correlation (NCC) or the sum of absolute differences (SAD: using the sum of absolute values of differences in luminance values).

After finding a difference as equal to or more than a given value between. the first parking target image and the second parking target image as a result of comparison, the comparison controller 64c selects the second parking target image to display in association with the current image. That is, a difference being a given value or more between the first parking target image and the second parking target image can be regarded as occurrence of change in the situation around the target parking position T before the target parking position T enters the dead area D. A pedestrian's entry or a change in the parking status of the adjacent parking space P1, for example, can be inferred. After the blind-spot determiner 54b determines that the target parking position T is in the dead area D, the synthesis controller 64b displays the second parking target image selected by the comparison controller 64c in association with the current image. As a result, the synthesis controller 64b can synthesize a complementary image more accurately reproducing the current peripheral situation as compared with associating the current image with the first parking target image (stored when the target parking position T is set). In addition, without increase in the transmittance of the second parking target image, the synthesis controller 64b can generate a viewable synthetic image with less strangeness representing the target parking position T in a dense manner.

With the difference being less than a given value between the contents of the first parking target image and of the second parking target image, no substantial change in the situation around the target parking position T from storing the first parking target image to storing the second parking target image can be inferred. In this case, the synthesis controller 64*b* uses the first parking target image stored when the driver first recognizes the target moving position as the image to be associated with the current image. As described above, the first parking target image is likely to be an image of the target parking position T captured from the front in a close distance with the lateral imager 24*d*, for example. Thus, the synthesis controller 64*b* can subject such an image to image processing including viewpoint conversion to be associated with the current image, to synthesize the image with the current image without a significant decrease in resolution. As a result, viewable synthetic images can be generated as compared with using the second parking target image. In this case, no substantial change in the situation around the target parking position T can be inferred, so that the first parking target image may remain low in transmittance.

As described above, the second parking target image is generated while the towing vehicle 10 (the towed vehicle 12) is moving for parking. Thus, the second parking target image may be generated farther away from target parking position than the first parking target image or the target parking position may be imaged in the periphery of the imaging range. In this case, viewpoint conversion to the second parking target image for display associated with the current image may reduce the resolution thereof and lower the image quality than the first parking target image, which is likely to be generated closely to the target parking position T from the front. Thus, the driver can select, through the operational input 30, display of the first parking target image with higher transmittance, which is likely to exhibit higher resolution and light representation, or the second parking target image, which is likely to exhibit lower resolution and easily viewable dense representation, for example.

Figure 11:
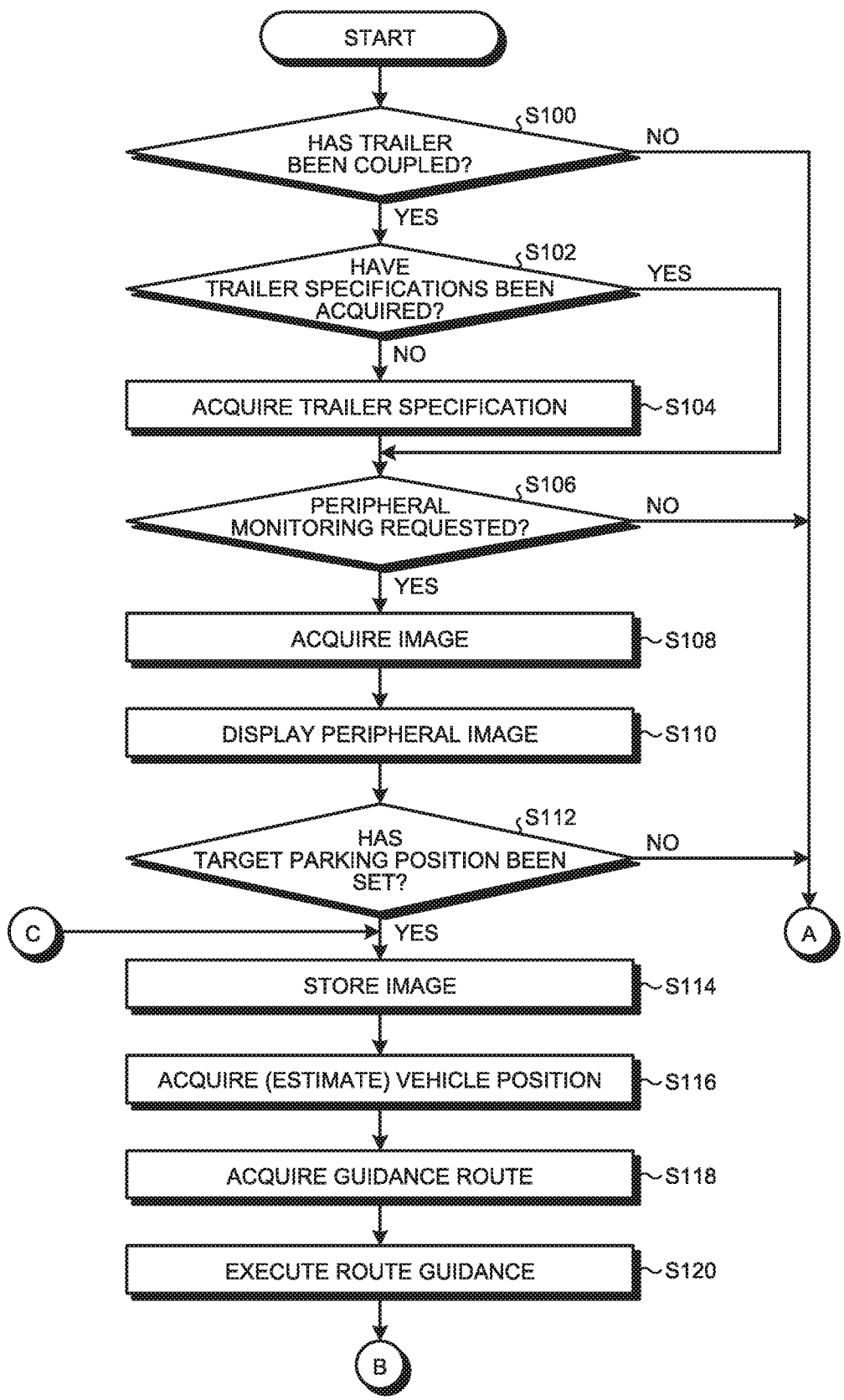
FIG. 11 is a flowchart of a first half of exemplary display processing of a periphery monitoring device according to an embodiment.

Display processing by the periphery monitoring device (periphery monitoring system 100) configured as above will be described with reference to the flowcharts in FIGS. 11 and 12. FIG. 11 is a flowchart illustrating the first half of the processing, and FIG. 12 is a flowchart illustrating the second half of the processing. The periphery monitoring device performs the processing illustrated in FIGS. 11 and 12 at a given cycle upon ON of the ignition switch of the towing vehicle 10, for example.

First, the CPU 36*a* checks whether the towed vehicle 12 is coupled to the towing vehicle 10 via the coupling determiner 54*a* (S100). After the coupling determiner 54*a* fails to determine the coupling of the towed vehicle 12 (No in S100), the CPU 36*a* temporarily ends the flow. After the coupling determiner 54*a* confirms the coupling of the towed vehicle 12 (Yes in S100), the CPU 36*a* checks whether the trailer-specification acquirer 50*f* has acquired the specifications of the towed vehicle 12 (S102). For example, with no inputs of the specifications of the towed vehicle 12 via the operational input 30 (No in S102), the trailer-specification acquirer 50*f* displays a screen to prompt the driver to input the specifications of the towed vehicle 12 on the display device 26 and acquire the specifications of the towed vehicle 12 (S104). If the trailer-specification acquirer 50*f* has acquired the specifications of the towed vehicle 12 (Yes in S102), the CPU 36*a* skips the operation of S104.

Subsequently, the CPU 36*a* checks whether the peripheral monitoring-request acquirer 50*a* has acquired a request signal representing start of peripheral monitoring. With no request signal acquired (No in S106), the CPU 36*a* temporarily ends the flow. After the peripheral monitoring-request acquirer 50*a* acquires a request signal representing start of peripheral monitoring (Yes in S106), the image acquirer 50*b* acquires image data (images) generated by the imagers 24 (24*a* to 24*d*) (S108). The image-conversion controller 64*a* performs image processing including viewpoint conversion to the image data acquired by the image acquirer 50*b*, to generate an overhead image TV as illustrated in FIG. 8, for example. The control unit 56 switches a normal screen as a navigation screen or an audio screen on the display device 26 to a peripheral monitoring screen displaying the overhead image TV generated by the image-conversion controller 64*a* and the actual image RV as rearward image generated by the imager 24*a*, and displays a peripheral image of the towing vehicle 10 (S110). In this case, the index acquirer 50*g* reads the vehicle icon 66*b* from the ROM 36*b* and displays the vehicle icon 66*b* at a given position on the overhead image IV.

After start of the peripheral monitoring, the CPU 36*a* checks whether the target setter 52 has set the target parking position T. When no target parking position T is set (No in S112), the CPU 36*a* temporarily ends the flow. After the target setter 52 sets the target parking position T (Yes in S112), the storing controller 62 stores an image including the target parking position T set as a parking target image in association with the coordinates of the target parking position T (S114). The storing controller 62 starts continuously storing the parking target image including the target parking position T.

On the coordinates having the origin at the current position of the towing vehicle 10 when the target parking position T is set, the target parking position T is represented by the coordinates relative to the origin. The vehicle position acquirer 50*d* acquires (estimates) the current position of the towing vehicle 10 on the coordinates (S116). As illustrated in FIG. 5, the guidance route acquirer 50*e* acquires (calculates) a guidance route R from the current position of the towing vehicle 10 (for example, guidance reference point B as a center of the axle of the rear wheels 14R) to the target guidance point C set corresponding to the target parking position T (S118). The CPU 36*a* executes route guidance to move the guidance reference point B (towing vehicle 10) along the acquired guidance route R (S120). This route guidance may be implemented by displaying a driver's operation such as steering, acceleration, and braking on the display device 26 or outputting audio through the audio output device 28, thereby allowing the driver to move the towing vehicle 10 along the guidance route R. In another embodiment, the CPU 36*a* may automatically execute all the driving operations including steering, acceleration, and braking using various sensors or actuators mounted on the towing vehicle 10, to move the towing vehicle 10 along the guidance route R. Alternatively, the CPU 36*a* may automatically execute part of the operations and provide the remaining operations to the driver through a display or audio to perform the remaining operations.

After start of the route guidance to move the towing vehicle 10 and the towed vehicle 12, the coupling angle acquirer 50*c* starts acquiring the coupling angle between the towing vehicle 10 and the towed vehicle 12 (S122). The index acquirer 50*g* reads, from the ROM 36*b*, the trailer icon 66*a* to superimpose on the overhead image of the towed vehicle 12 on the overhead. image TV on the basis of the specifications of the towed vehicle 12 acquired by the trailer-specification acquirer 50*f*. The synthesis controller 64*b* displays the trailer icon 66*a* on the overhead image TV in a superimposed manner (S124). The overhead image of the towed vehicle 12 can be displayed on the overhead image TV through viewpoint conversion to the image data, but may be extended long in shape and be inaccurately displayed, for example. Thus, the index acquirer 50g may acquire the trailer icon 66a upon display of the overhead image TV, irrespective of start of the route guidance, and the synthesis controller 64b may display the trailer icon 66a.

The blind-spot determiner 54b determines a blind spot as to whether the target parking position T enters in the dead area D while the towing vehicle 10 (the towed vehicle 12) is moving (S126). If the target parking position T is in the dead area D (Yes in S128), the comparison controller 64c compares the contents of the first parking target image of the target parking position T when set stored by the storing controller 62, with the contents of the second parking target image of the target parking position T immediately before entering the dead area D (S130). With the difference in content being not equal to or greater than a given value between the first parking target image and the second parking target image as a result of the comparison (No in S132), the synthesis controller 64b selects the first parking target. image of the target parking position T when set (S134). Then, the synthesis controller 61b displays the selected first parking target image (previous image) in association with the current image currently displayed on the display device 26 (S136). That is, as in the examples illustrated in FIGS. 9 and 10, the target parking position T hidden by the dead area D is complemented by a relatively clear, high-quality parking target image, which is stored at the time of setting the target parking position T. This allows the driver to easily recognize the positional relationship between the target parking position T and the towing vehicle 10 and the towed vehicle 12 and a moving status of the towed vehicle 12 with respect to the parking space P.

In S132, with the difference in content being equal to or greater than a given value between the first parking target image and the second parking target image as a result of the comparison (Yes in S132), the synthesis controller 64b selects the second parking target image of the target parking position T immediately before entering the dead area D, stored by the storing controller 62 (S138). The synthesis controller 64b displays the selected second parking target image (previous image) in association with the current image currently displayed on the display device 26 (S136). That is, the synthesis controller 64b complements the current image by the parking target image reflecting the surroundings of the target parking position T immediately before the target parking position T is hidden by the dead area D. As a result, the synthesis controller 64b generates a synthetic image reflecting a situation, for example, that a pedestrian enters the target parking position T or the parking space P in a period from setting the target parking position T to the target parking position entering the dead area D. In this case, although the second parking target image may lower in resolution, as described above, the synthetic image reflecting the latest peripheral situation can allow the driver to recognize the positional relationship between the target parking position and the towing vehicle 10 and the towed vehicle 12, and a moving status of the towed vehicle 12 with respect to the parking space P.

In S128, if the target parking position T is not in the dead area D (No in S128), the CPU 36a skips the operation of S130 to S138. The CPU 36a determines whether the towing vehicle 10 (guidance reference point B) has reached the target parking position T (target guidance point C). If it has (Yes in S140), the CPU 36a ends the peripheral monitoring (S142). That is, the control unit 56 returns the display of the peripheral monitoring screen to the normal display as a navigation screen or an audio screen on the display device 26. If the towing vehicle 10 (guidance reference point B) has not reached the target parking position T (target guidance point C) (No in S140), the CPU 36a proceeds to S114 and performs the processing from S114. In this case, the CPU 36a stores a parking target image of the towing vehicle 10 at the current moving position and acquires the current position of the towing vehicle 10 again, to eliminate the difference between the position of the towing vehicle 10 and the stored image. In addition, the CPU 36a acquires the guidance route R from the current position of the towing vehicle 10 to the target guidance point C again for error correction.

The flowcharts illustrated in FIGS. 11 and 12 are exemplary. Replacement or increase or decrease of the steps is applicable when appropriate as long as the currently displayed image can be complemented by the pre-stored parking target image including the target parking position T, when the target parking position T is in the dead area D. Thereby, the same or similar effects are attainable. For example, in place of S130 to S138, the parking target image, stored at the time of setting the target parking position T, may be changed in transmittance and displayed in association with the current image.

As described above, the periphery monitoring device (periphery monitoring system 100) according to the present embodiment can employ a system including the existing imagers 24 (24a to 24d) of the towing vehicle 10, to provide, without cost increase, a peripheral monitoring image which allows the driver to easily understand a peripheral situation irrespective of the specifications of the towed vehicle 12. The periphery monitoring device provides such a peripheral monitoring image to the driver, thereby enabling the driver to easily and safely move the towed vehicle 12 into the parking space P.

The above embodiment has described an example of parking only the towed vehicle 12 in the parking space P. That is, the towing vehicle 10 detaches the towed vehicle 12 and moves after parking the towed vehicle 12. However, the towing vehicle 10 may be parked in the parking space P together with the towed vehicle 12. In this case, the periphery monitoring device determines whether the parking space P is large enough to accommodate the towing vehicle 10 and the towed vehicle 12 at the time of setting the parking space P or the target parking position T, and calculates the guidance route R for placing the towed vehicle 12 and the towing vehicle 10 in the parking space P. In this case, the same or similar effects as in the above embodiment are attainable.

Further, the above embodiment has described an example of moving the towed vehicle 12 to the parking space P. However, the application of the periphery monitoring device is not Limited to parking. It is applicable to moving the towed vehicle 12 closer to the side of the road or moving it for changing directions. That is, the periphery monitoring device can visualize the dead area D occurring due to the motion of the towed vehicle 12 other than parking, and can attain the same or similar effects as the above embodiment.

Further, the above embodiment has described an example that the storing controller 62 stores the image data acquired by the image acquirer 50b as it is as the parking target image. However, the image data may be subjected to image processing and stored in a form to be easily associated with the current image, such as the overhead image. The above embodiment has described an example that the parking target image stored by the storing controller 62 is displayed if the target parking position T is in the dead area D. In another embodiment, for example, another window may be opened on the display device 26 after setting the target parking position T, to constantly display the parking target image thereon.

A peripheral monitoring program executed by the CPU 36a of the present embodiment may be recorded and provided in an installable or executable file format on a computer-readable recording medium such as a CD-ROM, a flexible disk (FD), a CD-R, or a digital versatile disk (DVD).

Further, the peripheral monitoring program may be stored on a computer connected to a network such as the Internet and provided by being downloaded via the network. The peripheral monitoring program executed by the present embodiment may be provided or distributed via a network such as the Internet.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A periphery monitoring device, comprising:
at least one processor configured to implement:
a coupling determiner that determines whether a towed vehicle is coupled to a towing vehicle to which the towed vehicle can be coupled;
a target setter that sets a target moving position to be a target for moving at least the towed vehicle coupled to the towing vehicle;
a storing controller that stores, as a moving target image, an image, including the target moving position, of a peripheral image captured by an image capture device at a first time and provided at the towing vehicle;
an image controller that displays the stored moving target image in association with the towing vehicle or the towed vehicle included in a current image capture by the image capture device at a second time after the first time and currently displayed on a display device; and
a blind-spot determiner that determines whether the target moving position enters a dead area caused by the towed vehicle in an imaging area of the image capture device, wherein
the image controller displays the stored moving target image in association with the towing vehicle or the towed vehicle when the target moving position is to enter the dead area.

2. The periphery monitoring device according to claim 1, wherein
the storing controller stores at least the moving target image generated when the target moving position is set.

3. The periphery monitoring device according to claim 1, wherein
the storing controller starts storing the moving target image when the target moving position is set.

4. The periphery monitoring device according to claim 1, wherein
when the target moving position is in the dead area on the current image, the image controller superimposes at least an image of the target moving position included in the stored moving target image, on at least an area of the dead area, the area corresponding to the target moving position.

5. The periphery monitoring device according to claim 4, wherein
the image controller superimposes the moving target image on the dead area in a transparent mode.

6. The periphery monitoring device according to claim 1, wherein
when a first moving target image and a second moving target image exhibit a difference in content equal to or greater than a given value, the image controller displays the second moving target image in association with the current image, the first moving target image being stored when the target moving position is set, the second moving target image being stored immediately before the target moving position enters the dead area.

7. The periphery monitoring device according to claim 1, further comprising:
a position acquirer that acquires a current position of the towing vehicle with reference to a position of the towing vehicle at the time of setting the target moving position;
an angle acquirer that acquires a coupling angle between the towing vehicle and the towed vehicle; and
an index acquirer that acquires a trailer index corresponding to a size of the towed vehicle, the trailer index being superimposable on the current image, wherein
in displaying the stored moving target image in association with the current image, the image controller determines a display posture of the trailer index in accordance with the current position of the towing vehicle and the coupling angle, and displays the trailer index on the current image in a superimposed manner.

* * * * *